United States Patent

Nirasawa et al.

[11] 3,893,117
[45] July 1, 1975

[54] MARINE RADAR TRANSMISSION AND RECEPTION SYSTEM

[75] Inventors: Tomiji Nirasawa, Kanagawa-ken; Hiroshi Ota, Tokyo, both of Japan

[73] Assignee: Kabushiki Kaisha Tokyo Keiki, Tokyo, Japan

[22] Filed: May 8, 1973

[21] Appl. No.: 358,456

[30] Foreign Application Priority Data
May 10, 1972 Japan............................ 47-46033

[52] U.S. Cl............................ 343/17.1 R; 343/7 A
[51] Int. Cl............................ G01s 9/06; G01s 7/28
[58] Field of Search ........ 343/17.1 R, 17.2 R, 16 R, 343/7 A

[56] References Cited
UNITED STATES PATENTS

| | | | |
|---|---|---|---|
| 2,901,747 | 8/1959 | Sunstein | 343/17.1 R |
| 2,994,080 | 7/1961 | Varela | 343/17.1 R |
| 3,126,543 | 3/1964 | Reed | 343/17.1 R |
| 3,149,333 | 9/1964 | Campbell | 343/17.1 R |
| 3,189,900 | 6/1965 | Raabe | 343/16 R |
| 3,273,147 | 9/1966 | Herscouki | 343/17.1 PF |
| 3,374,478 | 3/1968 | Blau | 343/17.1 R |
| 3,646,555 | 2/1972 | Atlas | 343/17.1 R |
| 3,668,702 | 6/1972 | Jones | 343/17.1 R |
| 3,761,922 | 9/1973 | Evans | 343/17.1 R |

Primary Examiner—Maynard R. Wilbur
Assistant Examiner—G. E. Montone
Attorney, Agent, or Firm—Marshall & Yeasting

[57] ABSTRACT

A marine radar transmission and reception system in which first and second transmission pulse radar waves are emitted as first and second pulse radar waves from first and second radar antennae or a common radar antenna; reflected waves of the first and second emitted pulse radar waves are received as first and second received pulse radar waves by the first and second radar antennae or the common radar antenna; the modes of the first and second transmission pulse radar waves are selected in cooperation with those of the first and second radar antenna or that of the common radar antenna so that the first and second received pulse radar waves may be received by the first and second radar antenna or the common radar antenna independently of each other; a quotient or difference output corresponding to the quotient or difference of the first and second received pulse radar waves or the first and second received outputs based thereon is obtained; and sea clutter eliminated received pulse radar waves or outputs based thereon that signal components of the period—in which the quotient or difference output exceeds one predetermined threshold value or lies between two threshold values—are eliminated or suppressed, are obtained.

4 Claims, 16 Drawing Figures

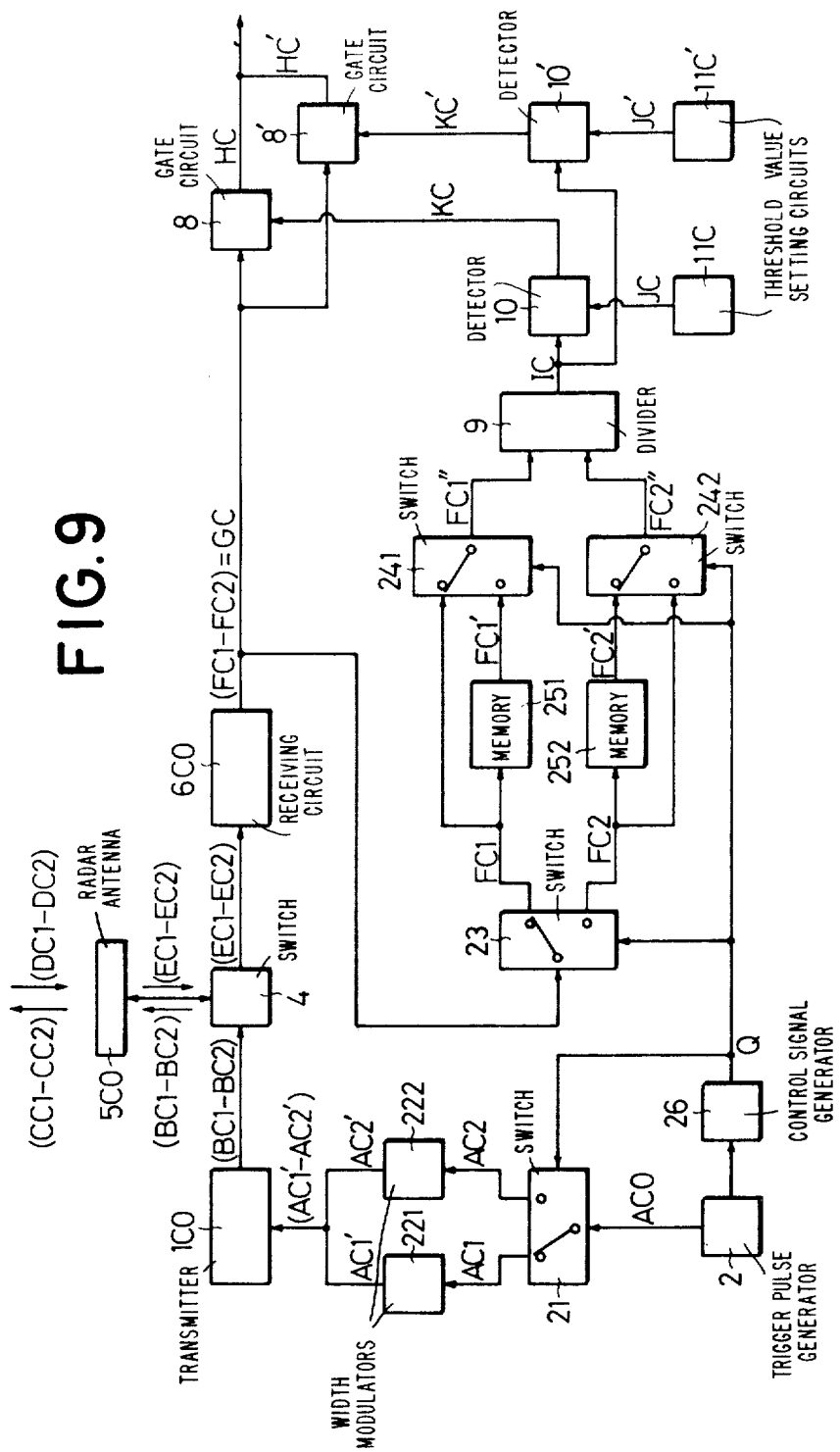

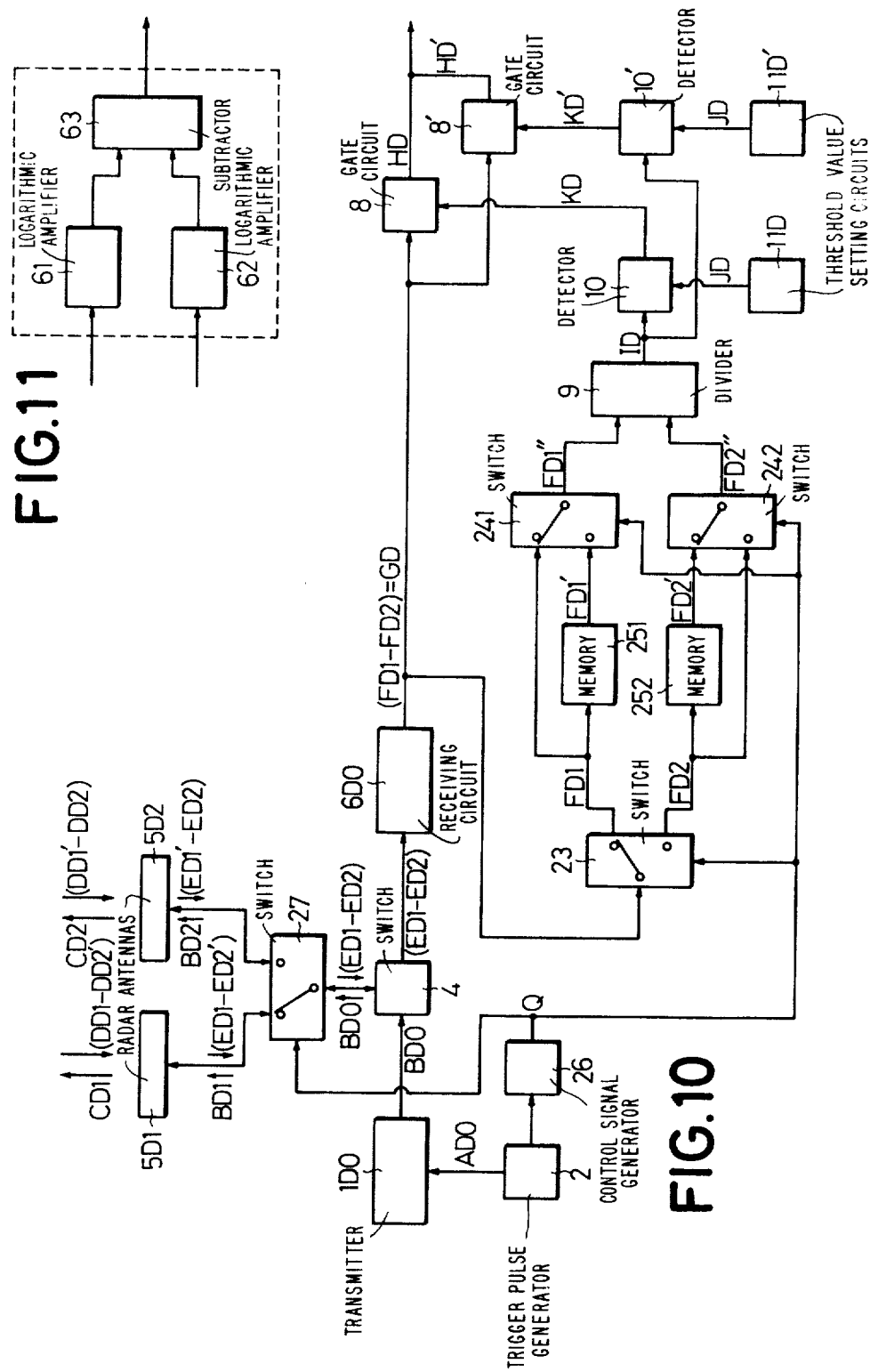

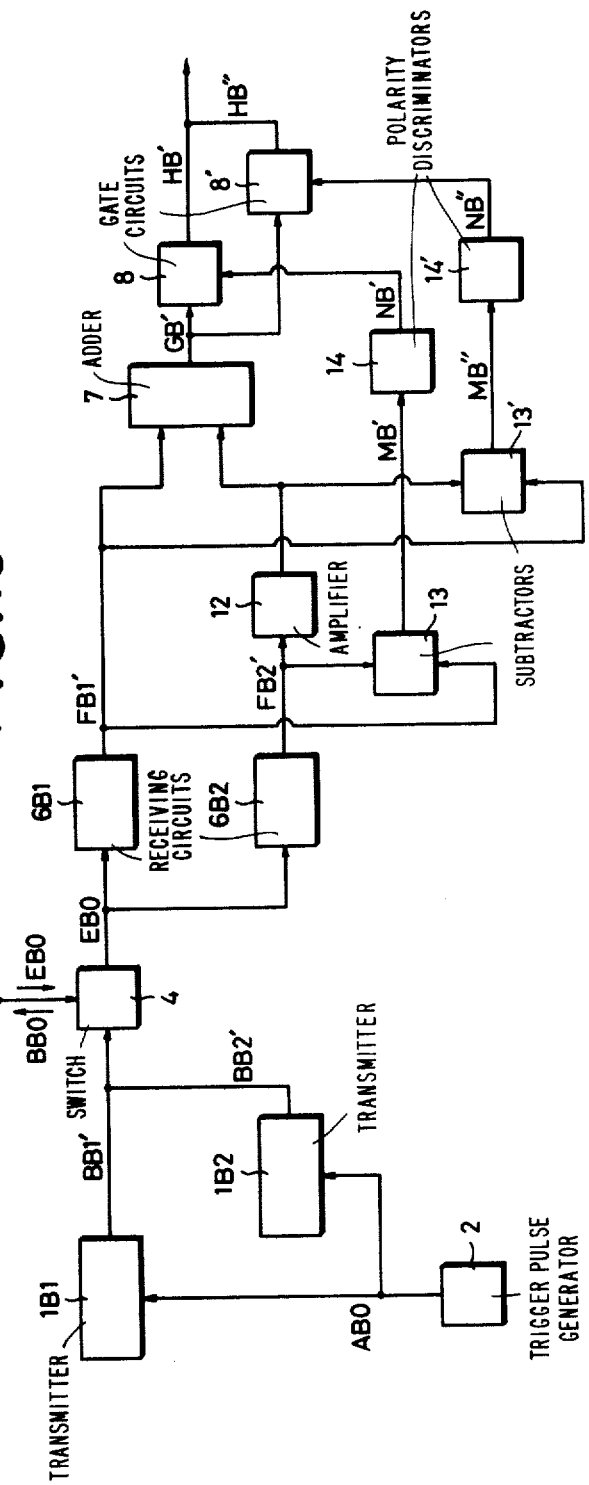

MARINE RADAR TRANSMISSION AND RECEPTION SYSTEM

BACKGROUND OF THE INVENTION

1. Field of the Invention

This invention relates to a marine radar transmission and reception system.

2. Description of the Prior Art

In marine radar transmission and reception, there are some occasions where sea clutter based on reflected waves from the surface of the sea gets mixed in received pulse radar waves based on reflected waves from a target. (The sea clutter is mixed in the received pulse radar waves while being superimposed thereon concurrently or not concurrently and, of course, it is not always mixed in the latter.) Accordingly, in a marine radar transmission and reception system, it is necessary to obtain received pulse radar waves or a received output based thereon from which the influence of the sea clutter has been eliminated.

To this end, various attempts have heretofore been made. It is the practice in the prior art that where the level of sea clutter is higher than a predetermined one, the clutter of the higher level is removed from received pulse radar waves or a received output based thereon, or that where the level of the sea clutter is equal to or a little higher than that of the received pulse radar waves, the clutter is eliminated from the received pulse radar waves or the received output based thereon, together with its one portion. Consequently, the conventional marine radar transmission and reception system has a defect such that even if the level of the received pulse radar waves is relatively high, the received pulse radar waves or the received output based thereon is unnecessarily lost or that if such an unnecessary loss of the received pulse radar waves or received output is prevented, the influence of the sea clutter cannot be neglected.

SUMMARY OF THE INVENTION

Accordingly, this invention is to provide a marine radar transmission and reception system which avoids the abovesaid defect encountered in the prior art and which effectively excludes or suppresses the influence of the sea clutter mixed in the received pulse radar waves from or in the received pulse radar waves or the received output based thereon.

Other objects, features and advantages of this invention will become apparent from the following description taken in conjunction with the accompanying drawings.

BRIEF DESCRIPTION OF THE DRAWINGS

FIGS. 7 to 10, inclusive, are block diagrams illustrating other examples of this invention;

FIG. 11 is a circuit diagram of a circuit equivalent to divider circuits employed in the examples of FIGS. 1, 3 to 5 and 7 to 10; and FIGS. 12 to 16, inclusive, are block diagrams illustrating other examples of this invention.

DESCRIPTION OF THE PREFERRED EMBODIMENTS

Figure 1:
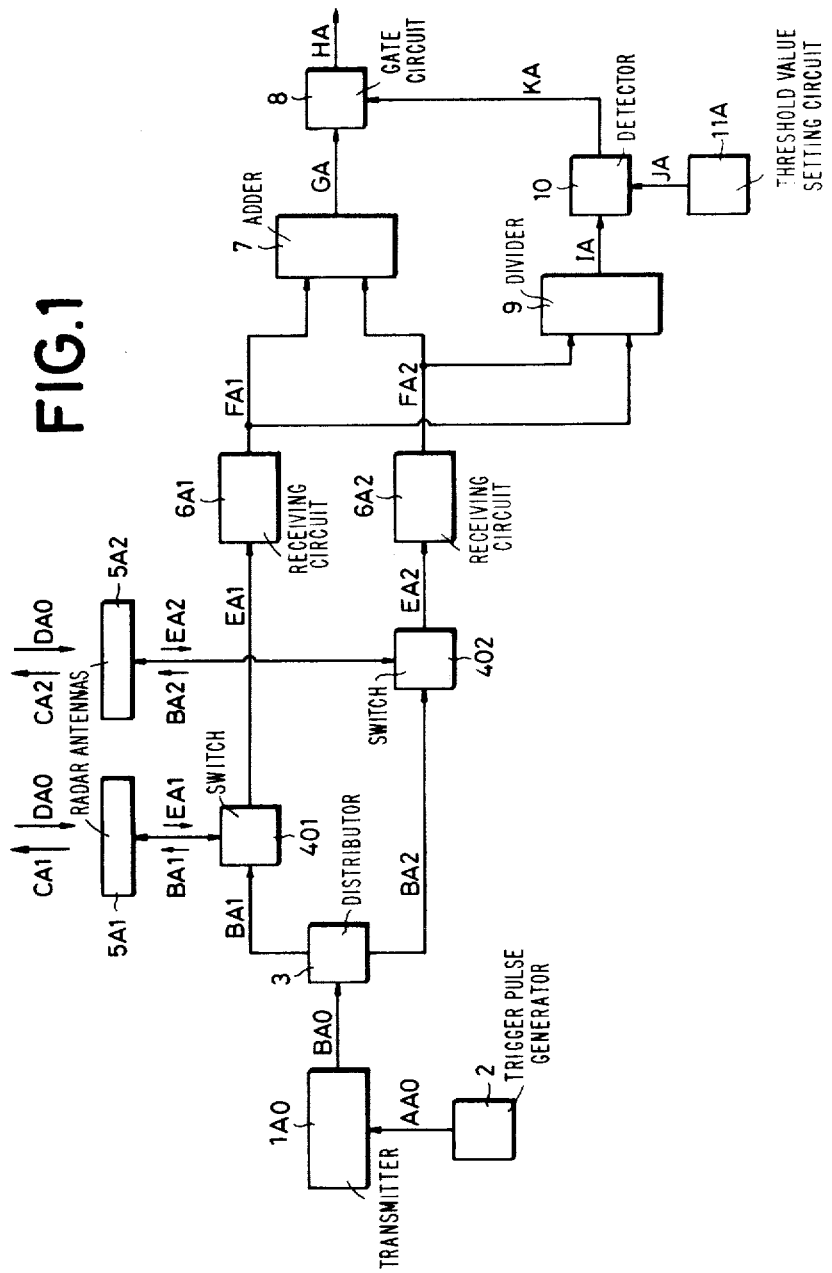
FIG. 1 is a block diagram showing one example of this invention.

In general, a received electric power S of received pulse radar waves based on reflected waves from a target in the radar transmission and reception system is expressed in the following form:

$$S = \frac{PA^2\sigma}{4\pi\lambda^2R^4} \quad (1)$$

where $P$ is the peak value of transmitting power of the pulse radar waves, $A$ the radiation area of a radar antenna, $\sigma$ the radar cross section or effective reflection sectional area of the target, $\lambda$ the carrier wavelength of the pulse radar waves and $R$ the distance to the target.

Thus, the received power $S$ of the received pulse radar waves in the radar transmission and reception system is usually given by the equation (1) but, in the marine radar transmission and reception system, sea clutter based on reflected waves from the surface of the sea gets mixed in received pulse radar waves based on reflected waves from a target such as a ship or the like, as described previously. The received power of the received pulse radar waves based on the reflected waves from the target and the received power of the sea clutter based on the reflected waves from the surface of the sea are identified as $S_0$ and $S_c$ respectively in this specification. Since mainly the radar cross section $\sigma$ among the parameters on the right side of the equation (1) varies dependent upon whether the received waves are those reflected from the target or the surface of the sea, the radar cross section $\sigma$ in the cases of the received waves being those reflected from the target and the surface of the sea are identified as $\sigma_0$ and $\sigma_c$ respectively in this specification. Accordingly, $S_0$ and $S_c$ are expressed by the following equations:

$$S_0 = \frac{PA^2\sigma_0}{4\pi\lambda^2R^4} \quad (2a)$$

$$S_c = \frac{PA^2\sigma_0}{4\pi\lambda^2R^4} \quad (2b)$$

By the way, our experiments have revealed the following facts in connection with the radar cross sections $\sigma_0$ and $\sigma_c$ given by the equations (2a) and (2b) respectively.

A. Each of $\sigma_0$ and $\sigma_c$ depends on the mode of polarization of pulse radar waves transmitted from the radar antenna supplied with transmission pulse radar waves, that is, whether the transmitted pulse radar waves are of vertical polarization or horizontal polarization.

B. Each of $\sigma_0$ and $\sigma_c$ depends on the carrier wavelength $\lambda$ of the transmission pulse radar waves in a mode expressed by a function $\sigma \propto F(\lambda)$ to $\lambda$, $F(\lambda)$ being not expressed by $F(\lambda) \propto \lambda^2$.

C. Each of $\sigma_0$ and $\sigma_c$ depends on the pulse width $\tau$ of the transmission pulse radar waves in a mode expressed by a function $\sigma \propto F(\tau)$ to $\tau$.

D. Each of $\sigma_0$ and $\sigma_c$ depends on the beam width $\theta$ of the transmission pulse radar waves, emitted in the form of a beam from the radar antenna, in a mode expressed by a relation $\sigma \propto F(\theta)$ to $\theta$.

a-1. Where the pulse radar waves emitted from the radar antenna are of vertical polarization, and a-2. Where the pulse radar waves from the radar antenna are of horizontal polarization, if the radar cross sections $\sigma_0$ in the case of the target are taken as $\sigma_{0a1}$ and $\sigma_{0a2}$ respectively and if the radar cross sections $\sigma_c$ in the case of the surface of the sea are taken as $\sigma_{ca1}$ and $\sigma_{ca2}$ respectively, the following relation is obtained:

$$\frac{\sigma_{0a1}}{\sigma_{0a2}} \neq \frac{\sigma_{ca1}}{\sigma_{ca2}} \qquad (3a)$$

b-1. Where the carrier wavelength $\lambda$ of the transmitted pulse radar waves is relatively short (the wavelength $\lambda$ being taken as $\lambda_1$ in this case), and b-2. where the carrier wavelength $\lambda$ of the transmitted pulse radar waves is relatively long (the wavelength $\lambda$ being taken as $\lambda_2$ in this case), if the radar cross sections $\sigma_0$ in the case of the target are taken as $\sigma_{0b1}$ and $\sigma_{0b2}$ respectively and if the radar cross sections $\sigma_c$ are taken as $\sigma_{cb1}$ and $\sigma_{cb2}$ respectively, the following relation is obtained:

$$\frac{\sigma_{0b1}}{\sigma_{0b2}} \neq \frac{\sigma_{cb1}}{\sigma_{cb2}} \qquad (3b)$$

c-1. Where the pulse width $\tau$ of the transmitted pulse radar waves is relatively large (the pulse width $\tau$ in this case being taken as $\tau_1$), and c-2. Where the pulse width $\tau$ of the transmitted pulse radar waves is relatively small (the pulse width $\tau$ in this case being taken as $\tau_2$), if the radar cross sections $\sigma_0$ in the case of the target are taken as $\sigma_{0c1}$ and $\sigma_{0c2}$ respectively and if the radar cross sections $\sigma_c$ in the case of the surface of the sea are taken as $\sigma_{cc1}$ and $\sigma_{cc2}$ respectively, the following relation is obtained:

$$\frac{\sigma_{0c1}}{\sigma_{0c2}} \neq \frac{\sigma_{cc1}}{\sigma_{cc2}} \qquad (3c)$$

d-1. Where the beam width $\theta$ of the transmitted pulse radar waves is relatively large (the beam width $\theta$ in this case being taken as $\theta_1$), and d-2. where the beam width $\theta$ of the transmitted pulse radar waves is relatively small (the beam width $\theta$ in this case being taken as $\theta_2$), if the radar cross sections $\sigma_0$ in the case of the target are taken as $\sigma_{0d1}$ and $\sigma_{0d2}$ respectively and if the radar cross sections $\sigma_c$ in the case of the surface of the sea are taken as $\sigma_{cd1}$ and $\sigma_{cd2}$ respectively, the following relation is obtained:

$$\frac{\sigma_{0d1}}{\sigma_{0d2}} \neq \frac{\sigma_{cd1}}{\sigma_{cd2}} \qquad (3d)$$

Based on the above relations given by the equations (3a) to (3d), the present invention is to provide a marine radar transmission and reception system in which the influence of the sea clutter resulting from reflected waves from the surface of the sea is effectively removed or suppressed from or in received pulse radar waves from a target or the resulting received output.

FIG. 1 is a block diagram showing one example of this invention which is based on the aforesaid relation given by the equation (3a). In FIG. 1, reference numeral 1A0 indicates a transmitter circuit, which is supplied with a trigger pulse AA0 from a trigger pulse generator circuit 2, and from which are derived transmission pulse radar waves BA0 of such a mode that a carrier having a sufficiently short wavelength $\lambda$ is "on" in the period of the pulse width $\tau$ of the trigger pulse AA0. The pulse radar waves BA0 thus obtained are distributed by a distributor circuit 3 as pulse radar waves BA1 and BA2 of substantially equal power, and they are supplied to radar antennae 5A1 and 5A2 through transmitting side terminals of transmission and reception switching circuits 401 and 402 respectively. In this case, the antennae 5A1 and 5A2 are identical in construction with each other except that they are adapted to emit therefrom the pulse radar waves BA1 and BA2 as pulse radar waves CA1 and CA2 of vertical and horizontal polarization modes respectively.

Consequently, the pulse radar waves CA1 and CA2, which are of substantially the same power but of vertical and horizontal polarization modes respectively, are respectively emitted in the form of beams of the same width $\theta$ from the antennae 5A1 and 5A2 in the same direction. The two beams of the emitted pulse radar waves CA1 and CA2 simultaneously irradiate substantially the same area defined by their beam width $\theta$ thereby to obtain composite reflected waves DA0 and those components of the composite reflected waves DA0 which are based on the pulse radar waves CA1 and CA2 are received individually. These received outputs are obtained as received pulse radar waves EA1 and EA2 through the receiving terminal sides of the transmission and reception switching circuits 401 and 402 respectively.

The received pulse radar waves EA1 and EA2 thus obtained are supplied to receiving circuits 6A1 and 6A2 each including a frequency converter, an intermediate-frequency amplifier circuit, a detector circuit, a detected output amplifying circuit and so on respectively, from which are derived equal received pulse waves FA1 and FA2 based on the received pulse radar waves EA1 and EA2. These received pulse waves FA1 and FA2 are applied to an adder circuit 7 to derive therefrom an added output GA of the received pulse waves FA1 and FA2 and the added output GA is supplied as received pulse waves HA through a gate circuit 8 to a system following the detected output amplifying system of usual radar apparatus.

In this case, the gate circuit 8 is controlled in the following manner. Namely, the received pulse waves FA1 and FA2 derived from the receiving circuits 6A1 and 6A2 are supplied to a divider circuit 9, from which is derived an output IA corresponding to the quotient of the received pulse waves FA1 and FA2 and the output IA is applied to a threshold value detector circuit 10. While the threshold detector circuit 10 is supplied with a threshold value set output JA fram a threshold value setting circuit 11A. Where the level of the quotient output IA is higher (or lower) than that of the threshold value set output JA, a threshold value detected output KA is derived from the threshold value detector circuit 10 and the gate circuit 8 is turned off by the threshold detected output KA.

The above is one example of this invention based on the relation of the equation (3a). With such an arrangement, if received powers of the received pulse radar waves EA1 and EA2 are taken as $S_{n1}$ and $S_{n2}$ respectively and if these received powers $S_{n1}$ and $S_{n2}$ in the case of the reflected waves DA0 being those from a target are taken as $S_{0n1}$ and $S_{0n2}$ respectively, it will be apparent that since the radar cross sections $\sigma$ in this case are $\sigma_{0n1}$ and $\sigma_{0n2}$ as described previously, the following relation can be obtained based on the equation (2a):

$$\frac{S_{0n1}}{S_{0n2}} = k_n \frac{\sigma_{0n1}}{\sigma_{0n2}} = \alpha_{0n} \qquad (4a)$$

where $k_n$ is a constant. Further, if the received powers $S_{n1}$ and $S_{n2}$ in the case of the reflected waves DA0 being those from the surface of the sea are taken as $S_{cn1}$ and $S_{cn2}$ respectively, it will also be seen that since the radar cross sections $\sigma$ in this case are $\sigma_{cn1}$ and $\sigma_{cn2}$ respectively described previously, the following relation can be obtained based on the equation (2b):

$$\frac{S_{cn1}}{S_{cn2}} = k_n \frac{\sigma_{cn1}}{\sigma_{cn2}} = \alpha_{cn} \qquad (5a)$$

Further, if the received powers $S_{n1}$ and $S_{n2}$ in the case of the reflected waves DA0 being those from both the target and the surface of the sea at the same time are taken as $S_{0cn1}$ and $S_{0cn2}$ respectively, it will also be understood that the following relation can be obtained:

$$\frac{S_{0cn1}}{S_{0cn2}} = \frac{S_{0n1} + S_{cn1}}{S_{0n2} + S_{cn2}} = \alpha_{0cn} \qquad (6a)$$

The equation (6a) expresses the relation between $S_{0cn1}$ and $S_{0cn2}$ in the case where the phase difference $\phi_{n1}$ between the phase $\phi_{0n1}$ of the carrier of the received pulse radar waves EA1 in the case of the reflected waves DA0 being those from a target and that $\phi_{cn1}$ of the carrier in the case of the reflected waves being those from the surface of the sea is zero, that is, $(\phi_{0n1} - \phi_{cn1}) = \phi_{n1} = 0$, and the phase difference $\phi_{n2}$ between the phases $\phi_{0n2}$ and $\phi_{cn2}$ of the carriers of the received pulse radar waves EA2 corresponding to $\phi_{0n1}$ and $\phi_{0c1}$ respectively is zero, that is, $(\phi_{0n2} - \phi_{0c2}) = \phi_{n2} = 0$, and hence $\phi_{n1} = \phi_{n2} = \phi_n = 0$.

Accordingly, if output values having the same proportional constant, corresponding to $\alpha_{0n}$, $\alpha_{cn}$, $\alpha_{0cn}$ and a predetermined value $\alpha_{sn}$ within the range of $\alpha_{0n}$ to $\alpha_{cn}$, are taken as $E_{0n}$, $E_{cn}$, and $E_{sn}$, if the value of the threshold value detected output JA derived from the threshold value setting circuit 11A is selected at $E_{sn}$ corresponding to $\alpha_{sn}$ and if the reflected waves DA0 are those from the target only, the quotient output IA derived from the divider circuit 9 has the value $E_{0n}$ corresponding to $\alpha_{0n}$. Consequently, the output $E_{0n}$ has a value outside of the range of $E_{sn}$ to $E_{cn}$ (which value, however includes $E_{sn}$), so that the threshold value detected output KA is not derived from the threshold value detector circuit 10 and the added output GA passes through the gate circuit 8. On the other hand, assuming that the reflected waves DA0 are only those from the surface of the sea, the quotient output IA has the value $E_{cn}$ corresponding to a $\alpha_{cn}$, so that the output $E_{cn}$ is obtained having a value outside of the range from $E_{0n}$ to $E_{sn}$ and the threshold value detected output KA is provided as representing that the value of the output IA is larger (or smaller) than that of the output JA. Consequently, the added output GA is prevented from passing through the gate circuit 8. Assuming that the reflected waves DA0 are those from both the target and the surface of the sea, the quotient output IA has the value $E_{0cn}$ corresponding to a $\alpha_{0cn}$ of the equation (6a) and this value $E_{0cn}$ is within the range from $E_{0n}$ to $E_{cn}$. Accordingly, where the value $E_{0cn}$ lies within the range from $E_{sn}$ to $E_{cn}$, the threshold value detected output KA is obtained to inhibit the passage of the added output GA through the gate circuit 8. While, where the value $E_{0cn}$ is within the range from $E_{0n}$ to $E_{sn}$, the threshold value detected output KA is not produced and the added output GA passes through the gate circuit 8.

Therefore, where sea clutter based on the reflected waves from the surface of the sea is mixed in the received pulse waves GA in such a manner that the quotient output IA from the divider circuit 9 exceeds the value $E_{sn}$ within the range from that $E_{0n}$ corresponding to $\alpha_{0n}$ of the equation (4a) to that $E_{cn}$ corresponding to $\alpha_{cn}$ of the equation (5a) towards the value $E_{cn}$, the received pulse waves HA derived from the gate circuit 8 is obtained in the form of such an output that a signal of the period, in which the above sea clutter is mixed in the received pulse waves GA, is removed therefrom. This relation will be described more concretely. If $\alpha_{0n}$ expressed by the equation (4a) is considered in a normalized form as $\alpha_{0n} = 1$, $\alpha_{cn}$ expressed by the equation (5a) has a relation that $\alpha_{cn} < 1$. If, now, $\alpha_{cn} = 5$ statistically, the abovesaid $\alpha_{sn}$ is selected, for example, at about 4.64 within a range from 1 to 5. Considering the value $E_{0n}$ of the quotient output IA corresponding to $\alpha_{0n}$ in a normalized form as $E_{0n} = 1$, the value $E_{cn}$ of the quotient output IA corresponding to $\alpha_{cn}$ is represented as $E_{cn} = 5$ and the value of the threshold value set output JA corresponding to $\alpha_{sn}$ is expressed as $E_{sn} = 4.64$. Accordingly, where the reflected waves DA0 are those from the target only, the quotient output IA is that $E_{0n} = 1$ and since $E_{0n} < E_{sn}$, the threshold value detected output KA is not produced and the added output GA passes through the gate circuit 8. Where the reflected waves are those from the surface of the sea only, the quotient output IA is that $E_{cn} = 5$ and since $E_{cn} > E_{sn}$, the output KA is provided and the output GA is prevented from passing through the gate circuit 8. Where the reflected waves DA0 are those from both of the target and the surface of the sea, the quotient output IA is $E_{0cn}$ lying in the range of $E_{0n} = 1$ to $E_{cn} = 5$, so that if the value of $E_{0cn}$ lies within the range of $E_{0n} = 1$ to $E_{sn} = 4.64$, the output KA is not obtained and the added output GA passes through the gate circuit 8. If the value of $E_{0cn}$ lies within the range of $E_{sn} = 4.64$ to $E_{cn} = 5$, the output KA is produced and the added output GA does not pass through the gate circuit 8. Accordingly, where sea clutter resulting from the reflected waves from the surface of the sea is mixed in the received pulse waves GA in such a relation that the quotient output IA exceeds $E_{sn} = 4.64$ the received pulse waves HA derived from the gate circuit 8 are obtained having removed therefrom a signal of the period in which the sea clutter is mixed.

Figure 2:
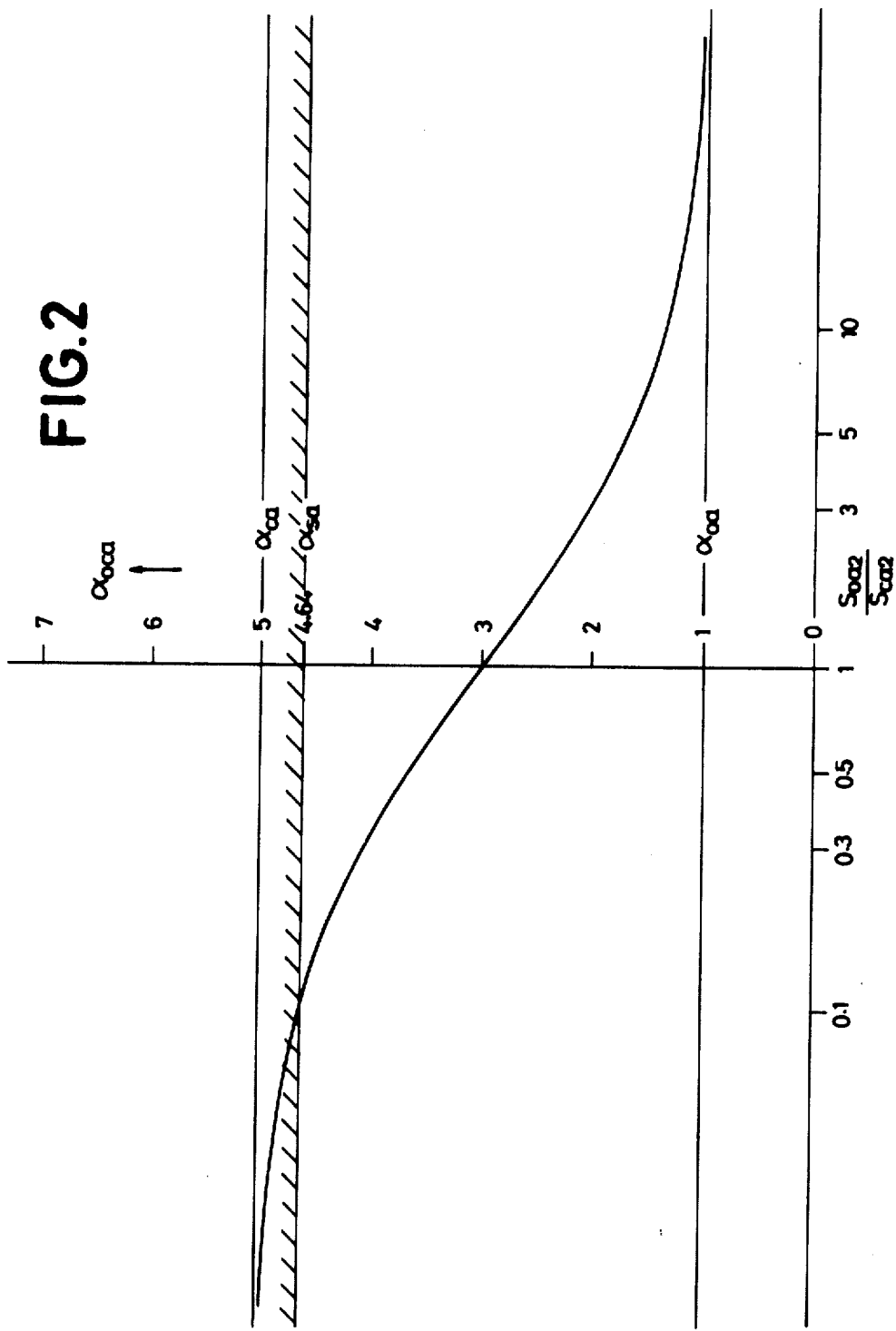
FIG. 2 is a graph showing a $(S_{0n2}/S_{cn2})v.s.\alpha_{0cn}$ curve, for explaining the example of FIG. 1.

This will become more apparent from the curve of FIG. 2 drawn on the assumption that $\phi_{n1} = \phi_n = 0$, $\alpha_{0n} = E_{0n} = 1$, $\alpha_{cn} = E_{cn} = 5$ and $\alpha_{sn} = E_s = 4.64$, the abscissa representing $S_{0n2}/S_{cn2}$ and the ordinate $\alpha_{0cn} = E_{0cn}$. Rewritten by using $\alpha_{ca}$ and $\alpha_{0a}$, the equation (6a) becomes as follows:

$$\frac{\alpha_{ca} + \alpha_{0a} \times \frac{S_{0a2}}{S_{ca2}}}{1 + \frac{S_{0a2}}{S_{ca2}}} = \alpha_{0ca} \quad (6a')$$

and substituting $\alpha_{ca} = 5$ and $\alpha_{0a} = 1$ in the above equation (6a'), the following equation is obtained:

$$\frac{5 + \frac{S_{0a2}}{S_{ca2}}}{1 + \frac{S_{0a2}}{S_{ca2}}} + \alpha_{0ca} \quad (6a'')$$

Based on this, $S_{0a2}/S_{ca2}$ in the equation (6a'') is used in the abscissa.

Accordingly, the foregoing example of this invention has an advantage that received pulse radar waves having effectively removed therefrom sea clutter can be obtained without incurring such a defect of the conventional marine radar transmission and reception system as described previously.

Figure 3:
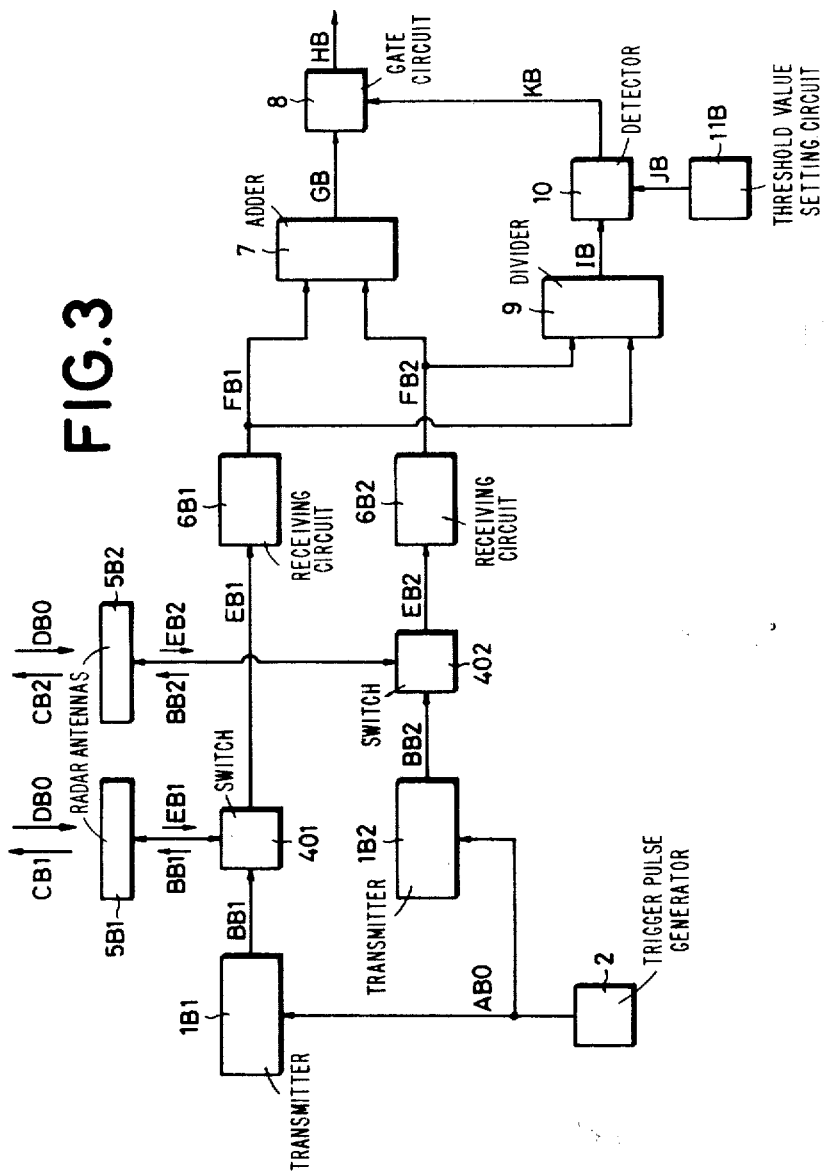
FIGS. 3 to 5, inclusive, are block diagrams illustrating other examples of this invention.

Referring now to FIG. 3, a description will be given of another example of this invention which is based on the relation given by the aforesaid equation (3b). In FIG. 3, reference numerals 1B1 and 1B2 designate transmitter circuits respectively, which are supplied with a trigger pulse ABO of the pulse width $\tau$ from the trigger pulse generator circuit 2 and from which are derived transmission pulse radar waves BB1 and BB2 of such modes that carriers having wavelengths $\lambda_1$ and $\lambda_2$ ($\lambda_1 < \lambda_2$) are "on" in the period of the pulse width $\tau$ of the trigger pulse ABO. These pulse radar waves BB1 and BB2 are supplied to radar antennae 5B1 and 5B2 through transmitting side terminals of the transmission and reception switching circuits 401 and 402 respectively. In this case, the antennae 5B1 and 5B2 are identical in construction with each other except that they are designed for the carriers $\lambda_1$ and $\lambda_2$ respectively.

Consequently, pulse radar waves CB1 and CB2 based on the transmission pulse radar waves BB1 and BB2, which are of substantially the same power but include the carriers of the wavelengths $\lambda_1$ and $\lambda_2$ respectively, are respectively emitted in the form of beams of the same width $\theta$ from the antennae 5B1 and 5B2 in the same direction. The two beams of the emitted pulse radar waves CB1 and CB2 provide composite reflected waves DBO and those components of the composite reflected waves DBO which are based on the emitted pulse radar waves respectively are individually received. These received outputs are obtained as received pulse radar waves EB1 and EB2 through receiving terminal sides of the transmission and reception switching circuits 401 and 402 respectively.

The received pulse radar waves EB1 and EB2 thus obtained are respectively supplied to the receiving circuits 6B1 and 6B2 each including a frequency converter, an intermediate-frequency amplifying circuit, a detector circuit and a detected output amplifying circuit, from which are derived the same detected received waves FB1 and FB2 based on the received pulse radar waves EB1 and EB2 respectively. The received radar waves FB1 and FB2 are applied to an adder circuit 7 and a divider circuit 9 as is the case with FIG. 1. Received pulse waves GB derived from the adder circuit 7 are fed to the gate circuit 8 to derive therefrom received pulse waves HB. While, a quotient output IB derived from the divider circuit 9 are supplied to the threshold value detector circuit 10 which is supplied with a threshold value set output JB from a threshold value setting circuit 11B. Where the value of the quotient output IB is larger (or smaller) than that of the threshold value set output JB, a threshold value detected output KB is derived from the threshold value detector circuit 10, by which the gate circuit 8 is controlled to be turned off.

The above is one example of this invention based on the relation of the aforementioned equation (3b). With such an arrangement as is the case with the example of FIG. 1, if received powers of the received pulse radar waves EB1 and EB2 are taken as $S_{b1}$ and $S_{b2}$ respectively, if the reflected waves DBO are those from a target and if the received powers $S_{b1}$ and $S_{b2}$ in the case of the reflected waves DBO being those from the surface of the sea are taken as $S_{0b1}$ and $S_{0b2}$, $S_{cb1}$ and $S_{cb2}$ respectively, it will be apparent that since the radar cross sections $\sigma$ in these cases are $\sigma_{0b1}$ and $\sigma_{0b2}$, $\sigma_{cb1}$ and $\sigma_{cb2}$ respectively as described previously, the following relations are obtained based on the equations (1) and (2) respectively:

$$\frac{S_{0b1}}{S_{0b2}} = k_b \frac{\sigma_{0b1}}{\sigma_{0b2}} = \alpha_{0b} \quad (4b)$$

$$\frac{S_{cb1}}{S_{cb2}} = k_b \frac{\sigma_{cb1}}{\sigma_{cb2}} = \alpha_{cb} \quad (5b)$$

where $k_b$ is a constant. It will also be apparent that if the received powers $S_{b1}$ and $S_{b2}$ in the case of the reflected waves being those from both the target and the surface of the sea are taken as $S_{0cb1}$ and $S_{0cb2}$ respectively, the following relation is obtained:

$$\frac{S_{0cb1}}{S_{0cb2}} = \frac{S_{0b1} + S_{cb1}}{S_{0b2} + S_{cb2}} = \alpha_{0cb} \quad (6b)$$

The equation (6b) expresses the relation between Ocb1 $S_{0cb1}$ and $S_{0cb2}$ in the case where the phase difference $\phi_{b1}$ between the phase $\phi_{0b1}$ of the carrier of the received pulse radar waves EB1 in the case of the reflected waves DBO being those from the target only and that $\phi_{cb1}$ of the carrier in the case of the reflected waves being those from the surface of the sea is zero, that is, ($\phi_{0b1} - \phi_{cb1}) = \phi_{b1} = 0$, and the phase difference $\phi_{b2}$ between the phases $\phi_{0b2}$ and $\phi_{cb2}$ corresponding to $\phi_{0b1}$ and $\phi_{cb1}$ respectively is zero, that is, ($\phi_{0b2} - \phi_{cb2}$) $= \phi_{b2} = 0$, and hence $\phi_{b1} = \phi_{b2} = \phi_b = 0$.

Accordingly, if output values having the same proportional constant, corresponding to $\alpha_{0b}$, $\alpha_{cb}$, $\alpha_{0cb}$ and a predetermined value $\alpha_{sb}$ within the range from $\alpha_{0b}$ to $\alpha_{cb}$, are taken as $E_{0b}$, $E_{cb}$, $E_{0cb}$ and $E_{sb}$ respectively and if the value of the threshold value set output JB is selected at $E_{sb}$ corresponding to $\alpha_{sb}$, the quotient outputs IB, which are derived from the divider circuit 9 in the cases where the reflected waves DBO are only those from the target, only those from the surface of the sea and those from both of them, have the values $E_{0b}$, $E_{cb}$ and $E_{0cb}$ corresponding to $\alpha_{0b}$, $\alpha_{cb}$ and $\alpha_{0cb}$ respectively, as is the case the example of FIG. 1. Therefore, where sea clutter resulting from the reflected waves from the surface of the sea is mixed in the received pulse waves GB in such a manner that the quotient output IB from the divider circuit 9 exceeds the value $E_{sb}$ corresponding to $\alpha_{sb}$ within the range of $\alpha_{ob}$ of the equation (4b) to $\alpha_{cb}$ of the equation (5b) towards that $E_{cb}$ corresponding to $\alpha_{cb}$, the received pulse waves HB derived from the gate circuit 8 is obtained in the form of such an output that a signal of the period, in which the above sea clutter is mixed in the received pulse waves GB, is removed therefrom. Thus, it is possible to obtain received pulse waves having effectively removed therefrom the sea clutter.

Figure 4:
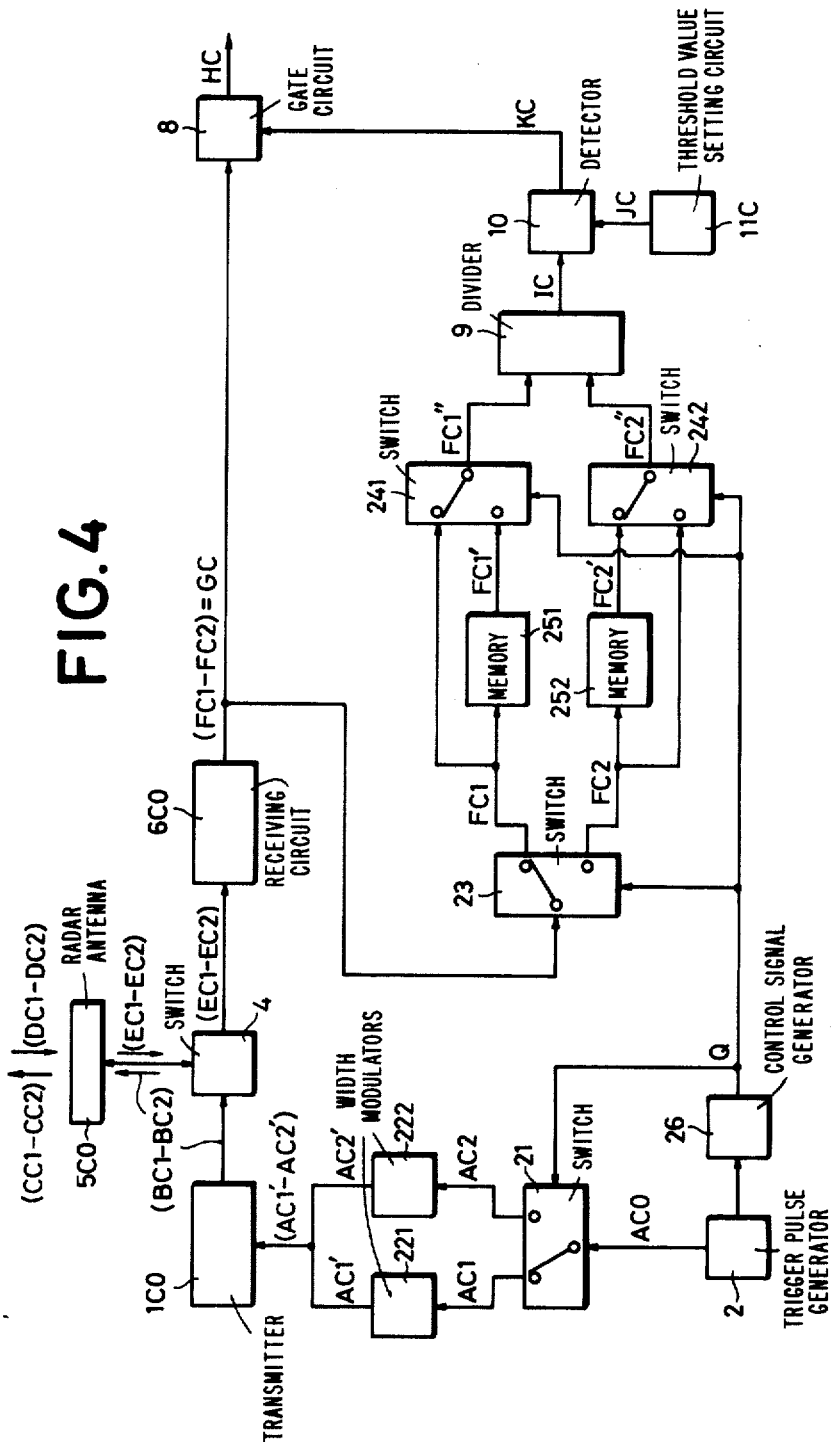

Turning now to FIG. 4, a description will be made of another example of this invention which is based on the relation of the aforesaid equation (3c). In FIG. 4, reference numeral 1CO identifies a transmitter circuit, which is supplied with a trigger pulse AC1'–AC2' whose pulse width $\tau$ sequentially alters to $\tau_1$ and $\tau_2$. The trigger pulse AC1'–AC2' are obtained in the following manner. Namely, a trigger pulse ACO from a trigger pulse generator circuit 2 is supplied to one input side of a switching circuit 21. The switching circuit 21 is controlled by a control signal Q having a frequency half that of the trigger pulse ACO, which is derived from a control signal generator circuit 26, in such a manner that the input side of the circuit 21 is connected to the one output side in odd-number periods of the trigger pulse ACO and to the other output side in even-number periods thereof. As a result of this, the switching circuit 21 derives from its two output sides trigger pulses AC1 having a frequency corresponding to the pulses of the odd-number periods of the trigger pulse ACO and trigger pulses AC2 of a frequency corresponding to the pulses of the even-number periods of the trigger pulse ACO respectively. The trigger pulses AC1 and AC2 thus obtained are applied to width modulator circuits 221 and 222 respectively, from which are obtained trigger pulses AC1' and AC2' which have different pulse widths $\tau_1$ and $\tau_2$ and a frequency half that of the trigger pulse ACO but are displaced apart in phase by one period of the trigger pulse ACO. The trigger pulse AC1' and AC2' are combined together to provide the aforesaid trigger pulse AC1'–AC2'.

From the transmitter circuit 1CO there are derived transmission pulse radar waves BC1–BC2 of such mode that carriers of the predetermined wavelength $\lambda$ are "on" in the period of the pulse width of the trigger pulse AC1'–AC2' whose pulse width $\tau$ sequentially alters to the values $\tau_1$ and $\tau_2$, and the pulse radar waves thus obtained are supplied to a radar antenna 5CO through the transmitting terminal side of a transmission and reception switching circuit 4.

As a result of this, pulse radar waves CC1–CC2 based on those BB1–BB2 are emitted from the antenna 5CO with the predetermined beam width and reflected waves DC1–DC2 of the beam are received. The resulting received output is obtained as received pulse radar waves EC1–EC2 through the receiving terminal side of the transmission and reception switching circuit 4.

The received pulse radar waves EC1–EC2 thus obtained are supplied to a receiving circuit including a frequency converter, an intermediate-frequency amplifier circuit, and a detected output amplifying circuit, to derive therefrom received pulse waves FC1–FC2 as received pulse waves GC that the received pulse radar waves EC1–EC2 have been detected. The received pulse waves GC are fed to a gate circuit 8 to obtain received pulse waves HC. Further, the received pulse waves GC are supplied to a switching circuit 23 which is changed over by the aforesaid control signal Q in synchronism with the switching circuit 21, thereby deriving from output sides of the switching circuit outputs of the received pulse waves GC and consequently EC1–EC2 in the odd- and even-number periods of the aforesaid trigger pulse ACO as received pulse waves FC1 and FC2 respectively. In this case, the received pulse waves FC1 and FC2 are alternately intermittent at a frequency twice that of the trigger pulse ACO but its is apparent that they are received pulse waves by the transmitted pulse radar waves based on the trigger pulse AC1' and AC2' respectively.

The received pulse waves FC1 tus obtained are supplied to the one input side of a switching circuit 241, which is changed over in synchronism with the switching circuit 23, and to the input side of a memory circuit 251. The output side of the memory circuit 251 is connected to the other input side of the switching circuit 241. Accordingly, the switching circuit 241 derives its output side continuous received pulse waves FC1'' that the intermittent received pulse waves FC1 and received pulse waves FC1' from the memory circuit 251, which are delayed behind those FC1 by one period of the trigger pulse ACO in the off state period of the waves FC1, have been combined together. In a similar manner, the received pulse waves FC2 are supplied to the one input side of a switching circuit 242 (corresponding to the input side of the switching circuit 241 on the side of the memory circuit 251), which is changed over in synchronism with the switching circuit 241, and to the input side of a memory circuit 252, the output side of which is connected to the other input side of the switching circuit 242. Thus, the switching circuit 242 derives therefrom continuous received pulse waves FC2'' that the intermittent received pulse waves FC2 and received pulse waves FC2', which are delayed behind the former FC2 by one period of the trigger pulse ACO in the off state period of the waves FC2, have been combined together.

The received pulse waves FC1'' and FC2'' thus derived from the switching circuits 241 and 242 respectively are applied to a divider circuit 9 to derive therefrom a quotient output IC, which is supplied to a threshold value detector circuit 10 which is supplied with a threshold value set output JC from a threshold value setting circuit 11c. Where the value of the quotient output IC is larger (or smaller) than that of the threshold value set output JC, the threshold value detector circuit 10 provides a threshold detected output KC, by which the gate circuit 8 is controlled to be turned off.

The above is another example of this invention which is based on the relation of the equation (3c). With such an arranged as described above, the received pulse waves FC1'' and FC2'' derived from the switching circuits 241 and 242 respectively correspond to those FA1 and FA2 described previously with regard to FIG. 1 and the are those based on the different pulse widths $\tau_1$ and $\tau_2$ respectively. Consequently, if received powers of the received pulse waves FC1'' and FC2'' are taken as $S_{c1}$ and $S_{c2}$ respectively, if the reflected waves DC1–DC2 are those from a target, and if the received powers $S_{c1}$ and $S_{c2}$ in the case of the reflected waves being those from the surface of the sea are taken as $S_{0c1}$ and $S_{0c2}$, $S_{cc1}$ and $S_{cc2}$ respectively, it will be apparent that since the radar cross sections $\sigma$ in these cases are $\sigma_{0c1}$ and $\sigma_{0c2}$, $\sigma_{cc1}$ and $\sigma_{cc2}$ as described previously, the following relations can be obtained based on the equations (1) and (2) respectively:

$$\frac{S_{oc1}}{S_{oc2}} = k_c \frac{\sigma_{oc1}}{\sigma_{oc2}} = \alpha_{oc} \quad (4c)$$

$$\frac{S_{cc1}}{S_{cc2}} = k_c \frac{\sigma_{cc1}}{\sigma_{cc2}} = \alpha_{cc} \quad (5c)$$

where $k_c$ is a constant. Further, it will also be seen that if the received powers $S_{c1}$ and $S_{c2}$ in the case of the reflected waves DC1-DC2 being those from both of the target and the surface of the sea are taken as $S_{occ1}$ and $S_{occ2}$ respectively, the following relation is obtained:

$$\frac{S_{occ1}}{S_{occ2}} = \frac{S_{oc1} + S_{cc1}}{S_{oc2} + S_{cc2}} = \alpha_{occ} \quad (6c)$$

In this case, however, the equation (6c), as described previously with regard to the equation (6a), expresses the relation between $S_{occ1}$ and $S_{occ2}$ in the case where $(\phi_{0c1} - \phi_{cc1}) = \phi_{c1} = 0$ and $(\phi_{0c2} - \phi_{cc2}) = \phi_{c2} = 0$, $\phi_{0c1}$, $\phi_{cc1}$, $\phi_{0c2}$ and $\phi_{cc2}$ being phases corresponding to $\phi_{0a1}$, $\phi_{ca1}$, $\phi_{0a2}$ and $\phi_{ca2}$ mentioned previously.

Accordingly, if output values having the same proportional constant, corresponding to $\alpha_{oc}$, $\alpha_{cc}$ and a predetermined value $\alpha_{sc}$ within the range from $\alpha_{oc}$ to $\alpha_{cc}$, are taken as $E_{oc}$, $E_{cc}$, $E_{0cc}$ and $E_{sc}$ and if the value of the threshold value set output JC derived from the threshold value setting circuit 11c is selected at $E_{sc}$ corresponding to $\alpha_{sc}$, the quotient outputs IC, derived from the divider circuit 9 in the cases of the reflected waves DC1-DC2 being those from the target, from the surface of the sea and from both of them, have the values $E_{oc}$, $E_{cc}$ and $E_{0cc}$ corresponding to $\alpha_{oc}$, $\alpha_{cc}$ and $\alpha_{0cc}$ respectively, as is the case with the example of FIG. 1. Consequently, where sea clutter based on the reflected waves from the surface of the sea is mixed in the received pulse waves GC in such a manner that the quotient output IC from the divider circuit 9 exceeds the value $E_{sc}$ corresponding to $\alpha_{sc}$ within the range from $\alpha_{oc}$ of the equation (4c) to $\alpha_{cc}$ of the equation (5c) towards the value $E_{cc}$ corresponding to $\alpha_{cc}$, the received pulse waves HC from the gate circuit 8 is obtained in the form of such an output that a signal of the period, in which the above sea clutter is mixed in the received pulse waves GC, is removed therefrom. Thus, it is possible to obtain received pulse waves having effectively removed therefrom the sea clutter.

Figure 5:
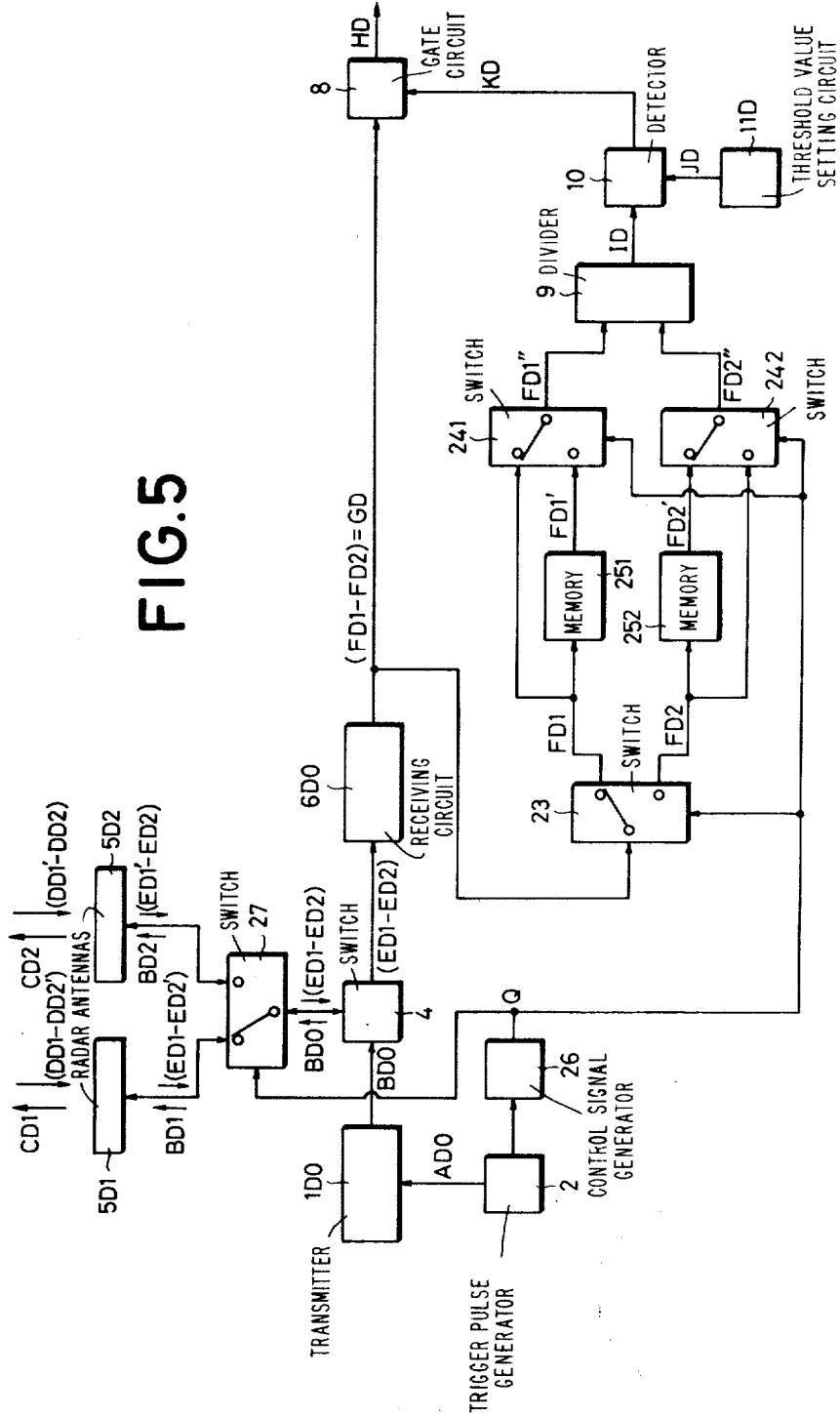

With reference to FIG. 5, a description will be given of another example of this invention which is based on the relation of the aforesaid equation (3d). In FIG. 5, reference numeral 1DO designates a transmitted circuit, which is supplied with a trigger pulse ADO from a trigger pulse generator circuit 2 and from which is derived transmission pulse radar waves BDO of such mode that a carrier having a wavelength $\lambda$ is "on" in the period of the pulse width $\tau$ of the trigger pulse ADO. The pulse radar waves BDO thus obtained are supplied to a switching circuit 27 through a transmission side terminal of a transmission and reception switching circuit 4. As is the case with the example of FIG. 4, the switching circuit 27 is controlled by a control signal from a control signal generator circuit 26 in such a manner that transmission pulse radar waves BD1 and BD2 of the waves BDO based on the odd- and even-number ones of the trigger pulse ADO respectively are supplied from two output sides of the switching circuit 27 to radar antennae 5D1 and 5D2 respectively. The pulse radar waves BD1 and BD2 thus applied to the radar antennae 5D1 and 5D2 are emitted therefrom respectively. In this case, however, the antennae 5D1 and 5D2 are identical in construction with each other except that the beam widths $\theta$ of the emitted pulse radar waves CD1 and CD2 are caused to have different values $\theta_1$ and $\theta_2$.

Accordingly, the pulse radar waves CD1 and CD2, which have the same power and include the carrier of the wavelength $\lambda$, are alternately and sequentially emitted in the form of beams of the different beam widths $\theta_1$ and $\theta_2$ from the antennae 5D1 and 5D2 in the same direction. Further, reflected waves DD1-DD2' and DD1'-DD2 based on the pulse radar waves CD1 and CD2 alternately and sequentially emitted from the antennae are received. The resulting received outputs are supplies as received pulse radar waves ED1-ED2' and ED1'-ED2 to two input sides of the aforesaid switching circuit 27 to derive therefrom received pulse radar waves ED1-ED2, corresponding to those EC1-EC2 in the example of FIG. 4, in which received pulse radar waves ED1 due to the reflected waves DD1 based on the emitted waves CD1 and those ED2 due to the reflected waves DD2 based on the emitted waves CD1 are sequentially arranged.

The received pulse radar waves ED1-ED2 thus obtained are applied through the transmission and reception switching circuit 4 to a receiving circuit 6DO including a frequency converter, an intermediate-frequency amplifier circuit, a detector circuit and a detected output amplifying circuit, from which are derived received pulse waves FD1-FD2 as received pulse waves GD that the received pulse waves ED1-ED2 have been detected. The received pulse waves FD1-FD2 are applied as received pulse waves GD to the gate circuit 8 to provide received pulse waves HD. Further, as in the case of FIG. 4, the received pulse waves GD are supplied to the switching circuit 23 to derive therefrom received pulse waves FD1 and FD2 corresponding to those FC1 and FD2 in the case of FIG. 4. Then, the received pulse waves FD1 are applied to the one input side of the switching circuit 251 and the memory circuit 251 and the other waves FD2 are fed to the one input of the switching circuit 242 and the memory circuit 252 in the same manner as in the example of FIG. 4. The output sides of the memory circuits 251 and 252 are connected to the other input sides of the switching circuits 241 and 242 respectively to derive therefrom received pulse waves FD1'' and FD2'' corresponding to those FC1'' and FC2'' in the case of FIG. 4 respectively.

The received pulse waves FD1'' and FD2'' thus obtained from the switching circuits 241 and 242 respectively are supplied to the divider circuit 9 as in the example of FIG. 4 and a quotient output ID derived therefrom is fed to the threshold value detector circuit 10 supplied with a threshold value set output JD from a threshold value setting circuit 11D. Where the value of the quotient output ID is larger (or smaller) than that of the threshold value set output JD, a threshold value detected output KD is obtained from the threshold value detector circuit 10, by which the gate circuit 8 is controlled to be turned off.

The above is another example of this invention which is based on the relation of the aforesaid equation (3d).

With such an arrangement as described above, it is apparent that the received pulse waves FD1″ and FD2″ derived from the switching circuits 241 aand 242 respectively correspond to those FA1 and FA2 described previously in connection with FIG. 1 and that they are based on the emitted pulse radar waves CD1 and CD2 of different beam widths $\theta_1$ and $\theta_2$ respectively. Accordingly, if the received powers of the received pulse waves FD1″ and FD2″ are taken as $S_{d1}$ and $S_{d2}$ respectively, if the reflected waves are all those from a target if the received powers $S_{d1}$ and $S_{d2}$ in the case of the reflected waves being those from the surface of the sea are taken as $S_{od1}$ and $S_{od2}$, $S_{cd1}$ and $S_{cd2}$ respectively, it is apparent that since the radar cross sections $\sigma$ in these case are $\sigma_{od1}$ and $\sigma_{od2}$, $\sigma_{cd1}$ and $\sigma_{cd2}$ as described previously, the following equations are obtained based on the equations (1) and (2):

$$\frac{S_{od1}}{S_{od2}} = k_d \frac{\sigma_{od1}}{\sigma_{cd2}} = \alpha_{od} \quad (4d)$$

$$\frac{S_{cd1}}{S_{cd2}} = k_d \frac{\sigma_{cd1}}{\sigma_{cd2}} = \alpha_{cd} \quad (5d)$$

where $k_d$ is a constant. It is also apparent that if the received powers $S_{d1}$ and $S_{d2}$ in the case of the reflected waves being those from the target and the surface of the sea are taken as $S_{ocd1}$ and $S_{ocd2}$ respectively, the following relation can be obtained:

$$\frac{S_{ocd1}}{S_{ocd2}} = \frac{S_{od1} + S_{cd1}}{S_{od2} + S_{cd2}} = \alpha_{ocd} \quad (6d)$$

In this case, however, the equation (6d), as described previously in connection with the equation (6a), expresses the relations between $S_{od1}$ and $S_{od2}$ and between $S_{cd1}$ and $S_{cd2}$ in the case where $(\phi_{od1} - \phi_{(d1)}) = \phi_{d1} = 0$ and $(\phi_{od2} - \phi_{cd2}) = \phi_{d2} = 0$, $\phi_{od1}$, $\phi_{cd1}$, $\phi_{od2}$ and $\phi_{cd2}$ being those phases corresponding to $\phi_{oa1}$, $\phi_{ca1}$, $\phi_{oa2}$ and $\phi_{ca2}$ described previously.

Accordingly, if output values having the same proportional constant, corresponding to $\alpha_{od}$, $\alpha_{cd}$ and a predetermined $\alpha_{sd}$ within the range from $\alpha_{od}$ to $\alpha_{cd}$ are taken as $E_{od}$, $E_{cd}$ and $E_{sd}$ respectively and if the value of the threshold value set output JD derived from the threshold value setting circuit 11D is selected at $E_{sd}$ corresponding to $\alpha_{sd}$, the quotient outputs ID, derived from the divider circuit 9 in the cases of the reflected waves DD1 and DD2 being those from the target, from the surface of the sea and from both of them, have the values $E_{od}$, $E_{cd}$ and $E_{ocd}$ corresponding to $\alpha_{od}$, $\alpha_{cd}$ and $\alpha_{ocd}$ respectively. Therefore, where sea clutter based on the reflected waves from the surface of the sea has been mixed in the received pulse waves GD in such a manner that the quotient output ID from the divider circuit 9 exceeds the value $E_{sd}$ corresponding to $\alpha_{sd}$ within the range from $\alpha_{od}$ of the equation (4d) to $\alpha_{cd}$ of the equation (5d) towards the value $E_{cd}$ corresponding to $\alpha_{cd}$, the received pulse waves HD from the gate circuit 8 is obtained in the form of such as output that a signal of the period, in which the above sea clutter is mixed in the received pulse waves GD, is removed therefrom. Thus, it is possible to obtain received pulse waves that the sea clutter has been effectively removed from the received pulse waves.

The foregoing has described examples of this invention which are based on the relations of the aforementioned equations (3a) to (3d) respectively. The foregoing examples have been described to obtain the relations of the equations (6a) to (6d) in connection with the received powers $S_{oc1}$ and $S_{oc2}$ ($S_{oca1}$ and $S_{oca2}$ in the example of FIG. 1, $S_{ocb1}$ and $S_{ocb2}$ in the example of FIG. 3, $S_{occ1}$ and $S_{occ2}$ in the example of FIG. 4 and $S_{ocd1}$ and $S_{ocd2}$ in the example of FIG. 5) in the case of the reflected waves being those from both of the target and the surface of the sea on the assumption that, with regard to the carrier of the received pulse radar waves corresponding to those waves fed to the one input of the divider circuit 9, the difference $\phi_1(\phi_{a1}, \phi_{b1}, \phi_{c1}$ and $\phi_{d1}$ in the examples of FIGS. 1, 3, 4 and 5 respectively) between the phase $\phi_{o1}$ ($\phi_{oa1}, \phi_{ob1}, \phi_{oc1}$ and $\phi_{od1}$ in the examples of FIGS. 1, 3, 4 and 5 respectively) in the case of the reflected waves being those from the target and the phase $\phi_{c1}(\phi_{ca1}, \phi_{cb1}, \phi_{cc1}$ and $_{cd1}$ in the examples of FIG. 1, 3, 4 and 5 respectively) in the case of the reflected waves being those from the surface of the sea is zero and that, with regard to the carrier of the received pulse radar waves corresponding to those waves supplied to the other input of the divider circuit, the difference $\phi_2$ between the phases $\phi_{o2}$ and $\phi_{c2}$ corresponding to those $\phi_{o1}$ and $\phi_{c1}$ is zero, and hence that $\phi_1$ 32 $\phi_2 = 0$. Namely, if the received powers $S_{o1}$ and $S_{o2}$ in the case of the reflected waves being those from both of the target and the surface of the sea are taken as $S_{oc1}$ and $S_{oc2}$ and if $$\phi_1 = \phi_2 = 0 \quad (7)$$

$$\frac{S_{oc1}}{S_{oc2}} = \frac{S_{o1} + S_{c1}}{S_{o2} + S_{c2}} = \alpha_{oc}' \quad (8)$$

In practice, however, the equation (7) does not always hold and, in general, if $$\phi_1 = \phi_2 = \phi \quad (9)$$

$$\frac{S_{oc1}}{S_{oc2}} = \frac{\sqrt{S_{o1}^2+S_{c1}^2-2S_{oc1}\cdot S_{c1}\cos(\pi-\phi)}}{\sqrt{S_{o2}^2+S_{c2}^2-2S_{o2}\cdot S_{c2}\cos(\pi-\phi)}} \quad (10)$$

Using $\alpha_0(\alpha_{oa}, \alpha_{ob}, \alpha_{oc}$ and $\alpha_{od}$ in the examples of FIGS. 1, 3, 4 and 5) and $\alpha_c(\alpha_{ca}, \alpha_{cb}, \alpha_{cc}$ and $\alpha_{cd}$ in the examples of FIGS. 1, 3, 4 and 5) and $S_{o2/sc2}= X$, the equation (10) is rewritten in the following form;

$$\frac{S_{oc1}}{S_{oc2}} = \sqrt{\frac{\alpha_c^2+\alpha_0^2X^2-2\alpha_c\alpha_0X\cos(\pi-\phi)}{1+X^2-2X\cos(\pi-\phi)}} = \alpha_{oc}' \quad (11)$$

The foregoing equation (6a') corresponds to the case of $\phi= 0$ in the equation (11).

Figure 6:
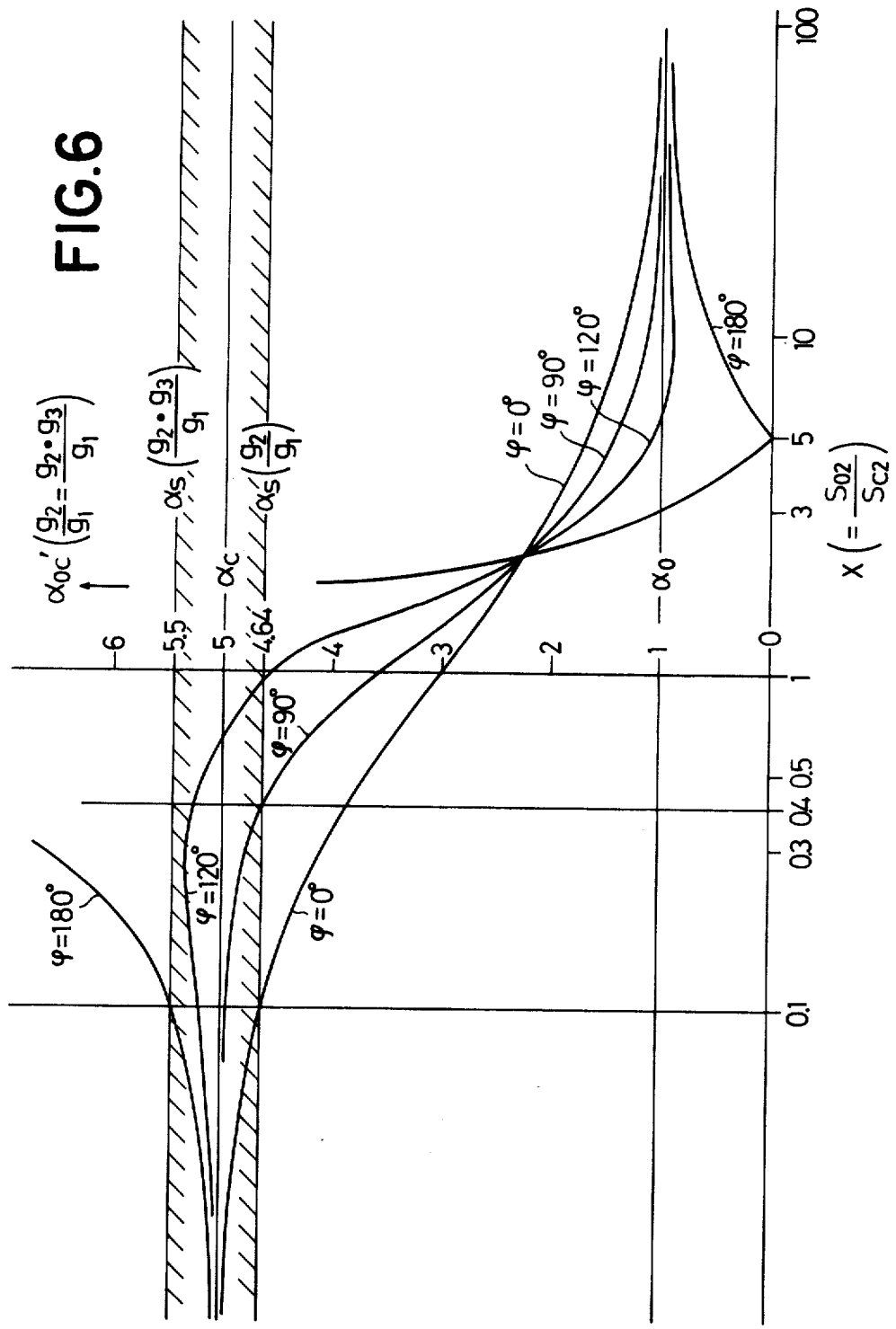
FIG. 6 is a graph, similar to FIG. 2, showing an $X(=S_{02}/S_{c2})v.s.\alpha_{0c}$ curve.

Based on the equation (11), such a relation as shown in FIG. 6 can be obtained, the abscissa representing X and the ordinate $\phi_{oc}$ ' and $\phi$ being a parameter. Accordingly, in the foregoing examples, if $\alpha_0 = 1$, if $\alpha_c = 5$ and if $\alpha_s(\alpha_{sa}, \alpha_{sb}, \alpha_{sc}$ and $\alpha_{sd}$ in the examples of FIGS. 1, 3, 4 and 5 respectively) is 4.64, it is possible to obtain received pulse waves that sea clutter has been effectively removed from the received pulse radar waves both in the cases where the reflected waves are those from the target and where they are those from the surface of the sea. Further, where the reflected waves are those from both of the target and the surface of the sea, if the value of $\phi$ is small, for example, 0° or 90°, a curve of X-$\alpha_{0c}$' gradually aproaches $\alpha_c$ from the side of values smaller than $\alpha_c$ within a range that X is smaller than 1 and the curve gradually approaches $\alpha_0$ from the side of values larger than $\alpha_0$ within a range that X is larger than 1. Where $\phi = 0°$, if the value of X is about 0.1 or more in terms of X, the received pulse waves pass through the gate circuit 8 and where $\phi= 90°$, if x is more than about 0.4, the received pulse waves pass through the gate cirucuit 8. Consequently, it is possible to obtain received pulse waves that the sea clutter has been effectively removed from the received pulse waves. However, where the reflected waves are those from both of the target and the surface of the sea, if $\phi$ has a large value such as 120° or 180°, the curve gradually approaches $\alpha_c$ from the side of values larger than $\alpha_c$ within a range that the value of X is smaller than 1 and the curve gradually approaches $\alpha_0$ from the side of values smaller than $\alpha_0$ within a range that the value of X is larger than 1. Consequently, as will be seen from the case of, for example, $\phi = 180°$, even if the value of X is about 0.1, the received pulse waves do not pass through the gate circuit 8 and even if the sea clutter has been effectively removed, the reflected wave components from the target are effectively utilized.

FIGS. 7, 8, 9 and 10 illustrate other examples of this invention, corresponding to those of FIGS. 1, 3, 4 and 5, which are adapted to ensure effective utilization of the reflected wave components from the target in the case of the reflected waves being those from both of the target and the surface of the sea as described previously.

In FIGS. 7, 8, 9 and 10, parts corresponding to those in FIGS. 1, 3, 4 and 5 are identified by the same reference numerals and no detailed description will be repeated. The illustrated examples of FIGS. 7 to 10 employ another gate circuit 8' connected in parallel with the gate circuit 8 and another threshold value detector circuit 10' also connected in parallel with the circuit 10. Further, these examples employ threshold value setting circuits 11A', 11B' 11C' and 11D' respectively. In the examples, threshold value set outputs JA', JB' JC' and JD', derived from the threshold value setting circuits 11A', 11B', 11C' and 11D' respectively, are supplied to the threshold value detector circuits 10 respectively. Where quotient outputs IA, IB, IC and ID from the divider circuits 9 are larger (or smaller) than the outputs JA', JB', JC' and JD' respectively, threshold value detected outputs KA', KB', KC' and KD' are derived from the threshold value detector circuits 10' respectively and supplied to the gate circuits 8' respectively.

In accordance with the examples of FIGS. 7 to 10, it will be apparent that $S_{o1}(S_{Oa1}, S_{Ob1}, S_{Oc1}$ and $S_{Od1}$ in the examples of FIGS. 7, 8, 9 and 10 respectively), $S_{o2}$ ($S_{Oa2}, S_{Ob2}, S_{Oc2}$ and $S_{Od2}$ in the examples of FIGS. 7, 8, 9 and 10 respectively), $S_{c1}(S_{Ca1}, S_{cb1}, S_{cc1}$ and $S_{cd1}$ in the examples of FIGS. 7, 8, 9 and 10 respectively) and $S_{c2}(S_{ca2}, S_{cb2}, S_{cc2}$ and $S_{cd2}$ in the examples of FIGS. 7, 8, 9 and 10 respectively) generally bear the following relations:

$$\frac{S_{o1}}{S_{o2}} = \alpha_0 \quad (12)$$

$$\frac{S_{c1}}{S_{c2}} = \alpha_0 \quad (13)$$

and that the relations given by the aforesaid equations (10) and (11) can be obtained.

Consequently, if output values having the same proportional constant, corresponding to $\alpha_0$, $\alpha_c$, $\alpha_{0c}'$, a predetermined value $\alpha_s$ within a range from $\alpha_0$ to $\alpha_c$ and a predetermined value $\alpha_s'$ on the opposite side from $\alpha_s$ outside of the range from $\alpha_0$ to $\alpha_c$, are taken as $E_0$, $E_c$, $E_{0c}'$, $E_s$ and $E_s'$ respectively, if the value of the threshold value set output J(JA, JB, JC and JD in the examples of FIGS. 7, 8, 9 and 10 respectively) derived from the threshold value setting circuit 11(11A, 11B 11C and 11D in the examples of FIGS. 7, 8, 9 and 10) is selected at $E_s$ corresponding to $\alpha_s$ and if the value of the threshold value set output J'(JA', JB', JC' and JD' in the examples of FIGS. 7, 8, 9 and 10 respectively) derived from the threshold value setting circuit 11'(11A', 11B', 11C' and 11D' in the examples of FIGS. 7, 8, 9 and 10 respectively) is selected at $E_s'$ corresponding to $\alpha_s'$, for example, in the case where $\alpha_s \approx 4.64$ and $\alpha_s' = 5.5$ when $\alpha_0$ 32 1 and $\alpha_c = 5$ and when the reflected waves are those from the target, a quotient output I(IA, IB, IC and ID in the examples of FIGS. 7, 8, 9 and 10 respectively) derived from the divider circuit 9 is such that $E_0 = 1$ since $E_0 < E_s$ and $E_0 < E_s'$, a threshold value detected output K(KA, KB, KC and KD in the examples of FIGS. 7, 8, 9 and 10 respectively) cannot be obtained. An output G(GA, GB, GC and GD in the examples of FIGS. 7, 8, 9 and 10 respectively) passes through the gate circuit 8 but a threshold value detected output K'(KA', KB', KC' and KD' in the examples of FIGS. 7, 8, 9 and 10 respectively) is produced and the output G does not pass through the gate circuit 8'. Further, where the reflected waves are those from the surface of the sea, since the quotient output I from the divider circuit 9 is that $E_c = 5$, $E_c > E_s$ and $E_c < E_s'$, the threshold value detected outputs K and k' are both obtained to inhibit the passage of the output G through the gate circuits 8 and 8'. Moreover, where the reflected waves are those from both of the target and the surface of the sea, the quotient output I from the divider circuit 9 is obtained as $E_{0c}207$ corresponding to $\alpha_{0c}'$. If the value of $E_{0c}'$ is less than $E_s'$ the threshold value detected output K is not produced but that K' is provided, so that the output G passes through the gate circuit 8 only. If the value of $E_{0c}'$ is above $E_s'$, the threshold value detected vaule K is produced but that K' is not provided, so that the output G passes through the gate circuit 8' only. If the value of $E_{0c}'$ lies within the range from $E_s$ to $E_s'$, the threshold value detected outputs K and K' are neither obtained and the output G does not pass through both of the gate circuits 8 and 8'.

Accordingly, where sea clutter based on the reflected waves from the surface of the sea has been mixed in the received pulse waves G in such a manner that the value of the quotient output I exceeds the value $E_s \approx 4.64$, the received pulse waves from the gate circuit 8 are obtained in the form of such an output that a signal of the period, in which the sea clutter is mixed in the received pulse waves G, is removed therefrom. While, where sea clutter is mixed in the received pulse waves G in such a manner that the value of the quotient output I is less than the value $E_s' \approx 5.5$, received pulse waves HA' from the gate circuit 8' are obtained in the form of such an output that a signal of the period, in which the sea clutter is mixed in the received pulse waves G, is removed therefrom. Therefore, where the sea clutter is mixed in the received pulse waves within the range of $E_s$ to $E_s'$, the composite waves of the received pulse waves from the gate circuits, that is, those HA and HA' are obtained in the form of such an output that a signal of the period, in which the sea clutter is mixed in the received pulse waves, is removed therefrom.

This will become more apparent from the curve shown in FIG. 6 which is based on $\alpha_0 = E_0 = 1$, $\alpha_c E_c = 5$, $E_s \approx 4.64$ and $E_s' \approx 5.5$.

The foregoing description has been made in connection with two examples of this invention which are based on each of the relations of the equations (3a) to (3d). It will be apparent to those skilled in the art that the examples described above with regard to FIGS. 1, 3 to 5 and 7 to 10 can be used in any desired combination, though not described in detail.

Although the foregoing description has been given in connection with the case where the divider circuit 9 is employed for obtaining the quotient output I(IA to ID), it is also possible to replace the divider circuit 9 with two logarithmic anplifier 61 and 62 and a subtractor circuit 63 as shown in FIG. 11. In such a case, the one input corresponding to the one input to the divider circuit 9 in the examples of FIGS. 1 and 3 to 5 is logarithmically amplified by the one logarithmic amplifier 61 and, similarly, the other input is logarithmically amplified by the other logarithmic amplifier 62. These logarithmically amplified outputs are supplied to the subtractor circuit 63 and its output is applied to the threshold value detector circuit(s) 10 (and 10'). Further, it is possible that the output(s) J(JA to JD) (and J'(JA' to JD')) derived from the threshold value setting circuit(s) 11(11A to 11D)(and 11'(11A' to 11D')) have values log $E_s$ and log $E_s'$. Thus, it is apparent that the value of the output I from the subtractor circuit 63 is log $E_0$ in the case of the reflected waves being those from the target, log $E_c$ in the case of the reflected wave from the surface of the sea and log $E_{0c}$ in the case of the reflected waves from both of them and that these outputs correspond to the quotient outputs in the examples of FIGS. 1, 3 to 5 and 7 to 10 respectively.

Therefore, the output(s) K(KA to KA) (and K'(KA' to KB')) are obtained as in the foregoing examples, thus providing the same results as those in the foregoing.

In the examples of FIGS. 1, 3, 7 and 8, the adder circuit 7 is employed but it is also possible to omit it and supply the one output from one of the two receiving circuits to the gate circuit. It is also possible in the examples of FIGS. 4, 5, 9 and 10 that, instead of supplying the output from the receiving circuit to the gate circuit(s), the sum of the two outputs from the two switching circuits to the divider circuit 9 or the one output from one of the two switching circuits is applied to the gate circuit(s). Further, while the foregoing description has been given with regard to the case where the divider circuit 9 or the circuit equivalent thereto, shown in FIG. 11, is employed, the use of a subtractor circuit in place of it also provides the same results as those obtainable with the former.

Figure 7:
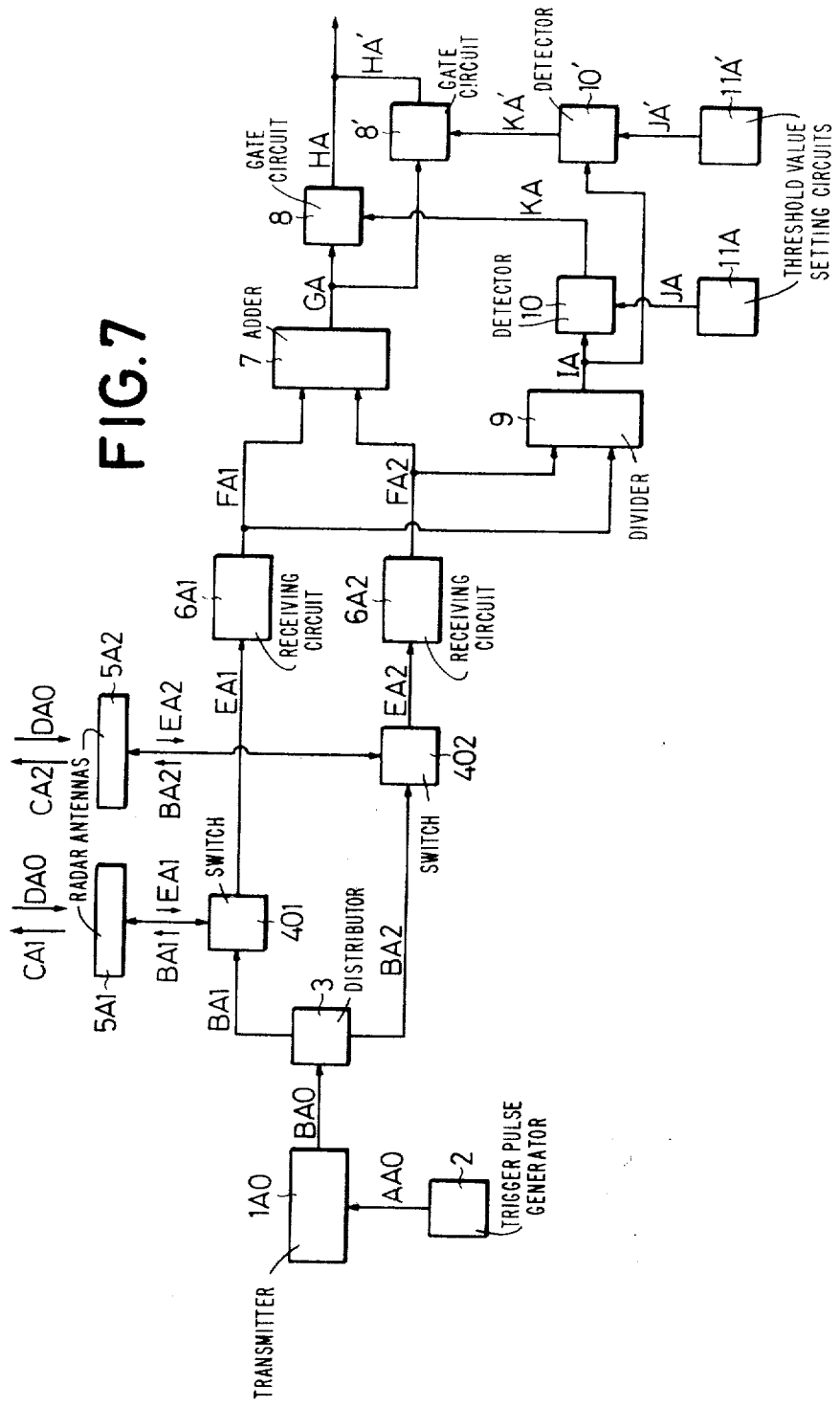
Figure 8:
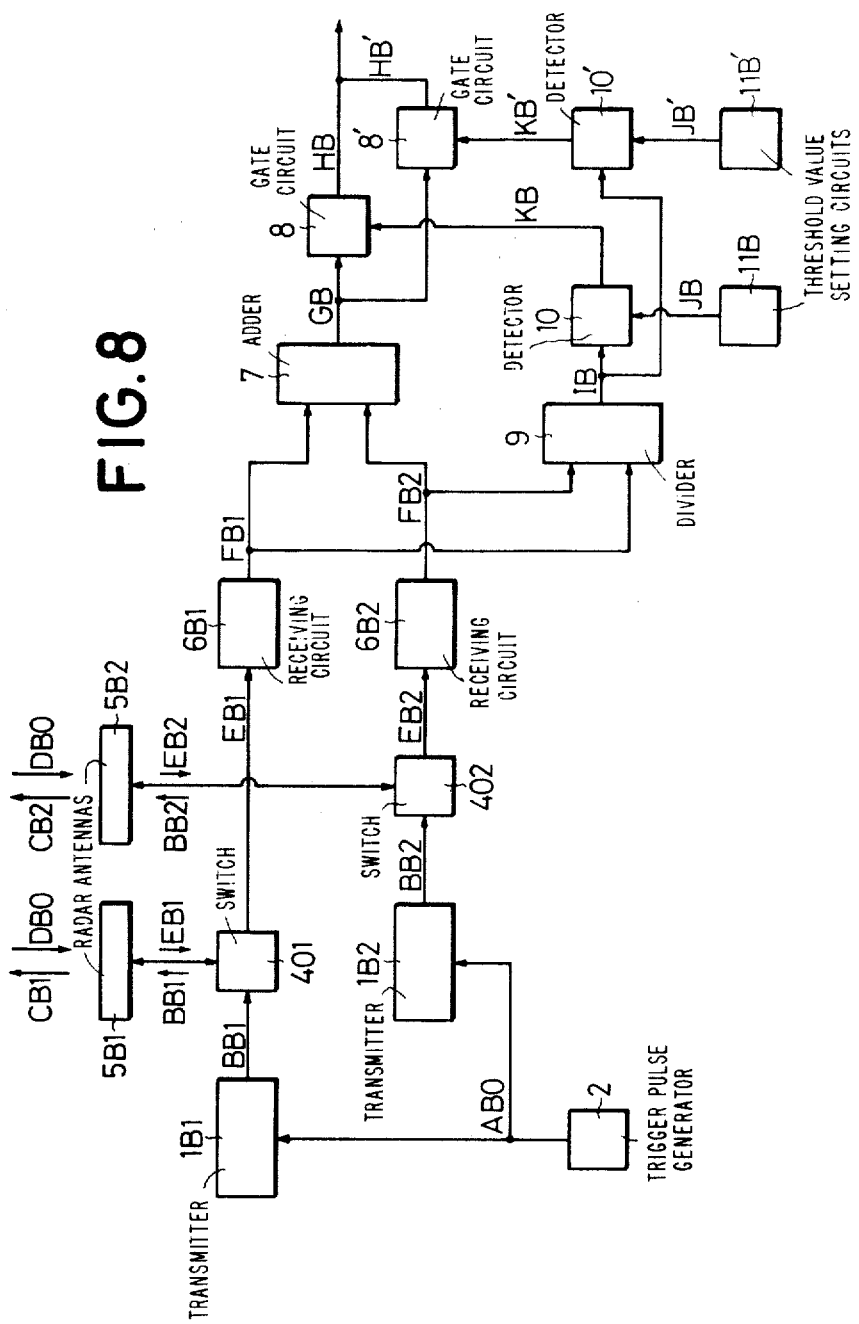
Figure 12:
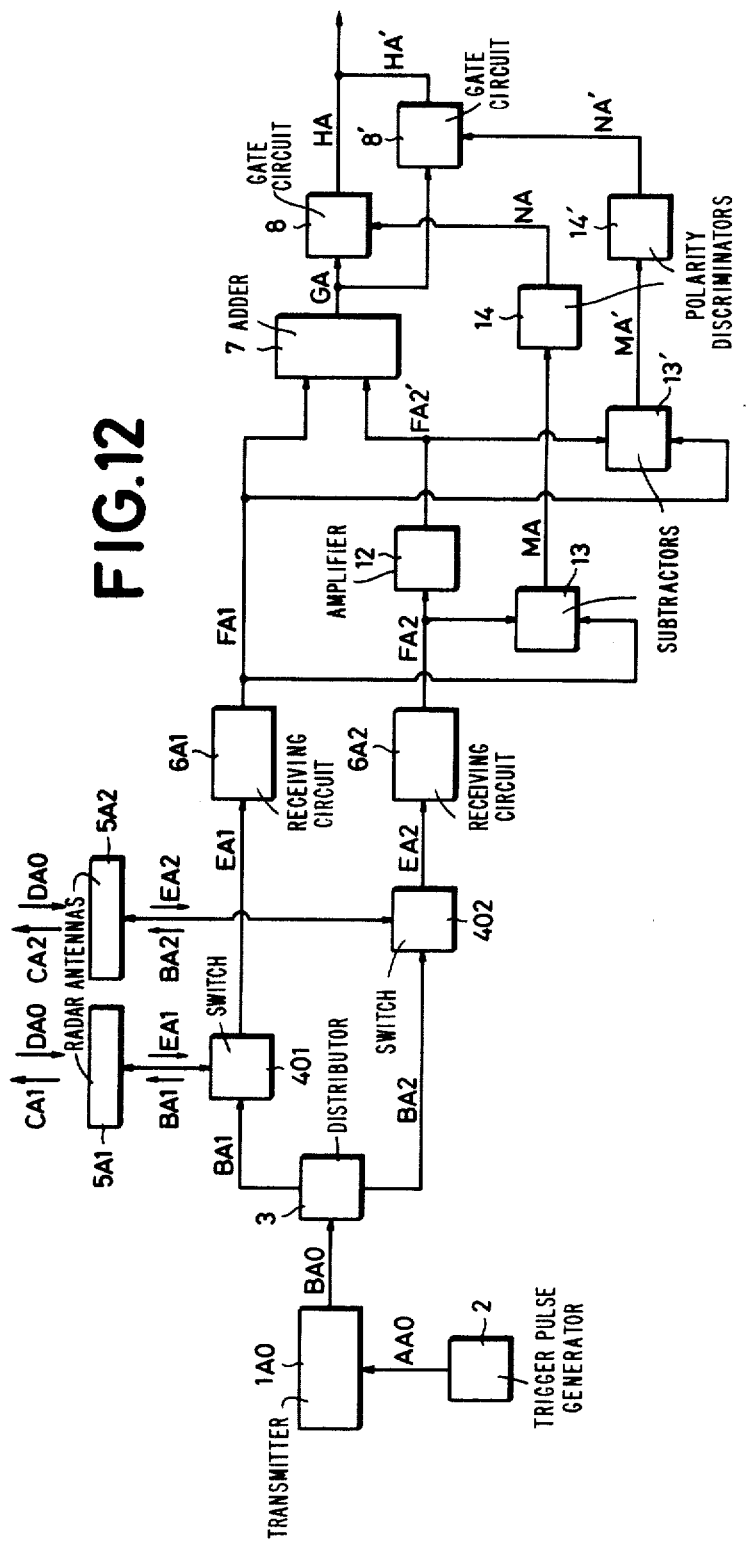
Figure 13:
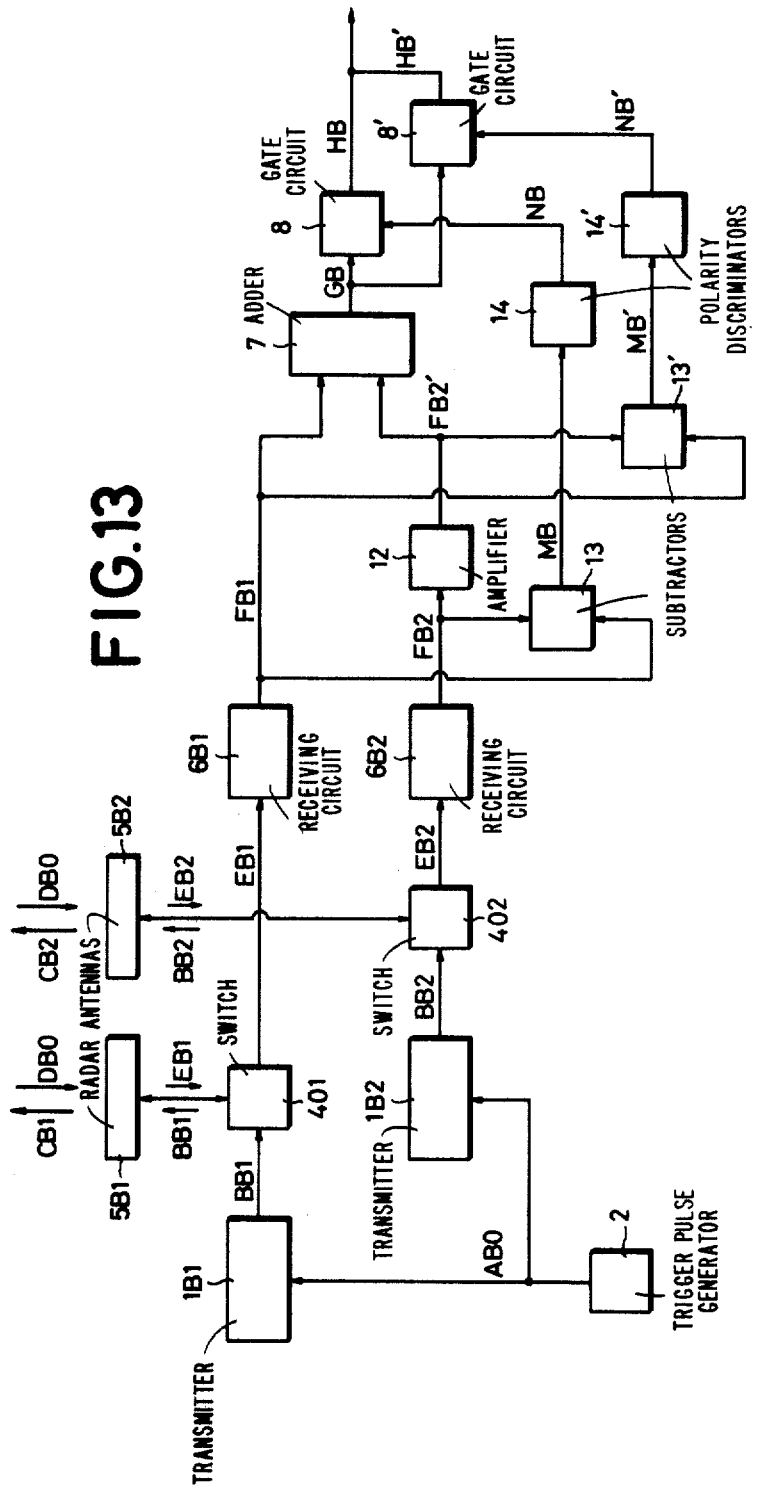
Figure 14:
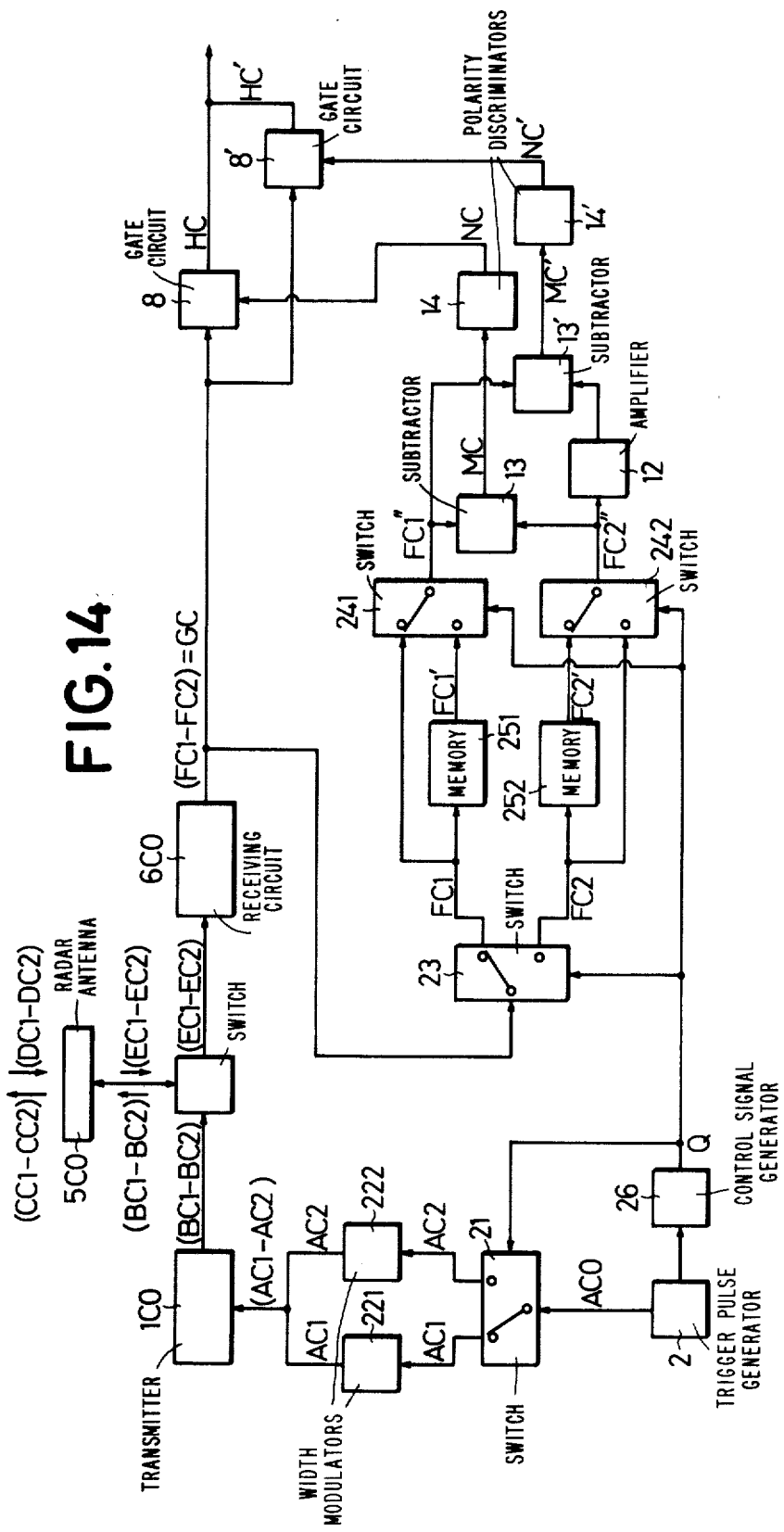
Figure 15:
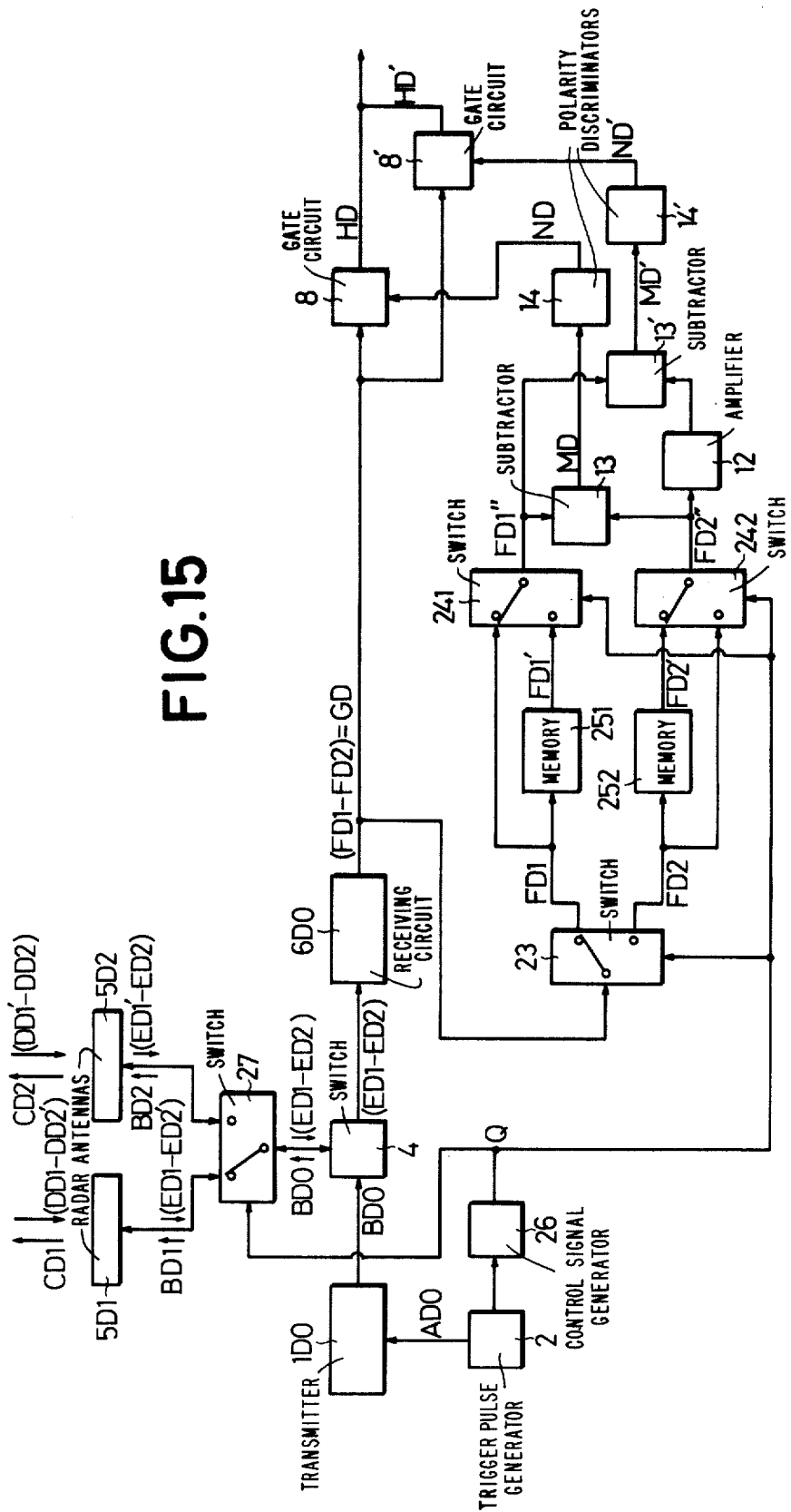

FIGS. 12 to 15, inclusive, illustrate examples employing the subtractor circuit, corresponding to the examples of FIGS. 7 and 10. In the examples of FIGS. 12 and 15, like reference numerals indicate the same parts and no detailed description will be made. The examples of FIGS. 12, 13, 14 and 15 are identical in construction with those of FIGS. 7, 8, 9 and 10 except in the following points. Namely, the divider circuit 9, the threshold value detector circuits 10 and 10' and threshold value setting circuits 11 and 11' used in the examples of FIGS. 7 to 10 are left out. However, an amplifier 12 is inserted in the line by which the received pulse waves F2(FA2, FB2, FC2'' and FD2'' in the examples of FIGS. 12, 13, 14 and 15) are supplied to the one input terminal of the adder circuit 7. The difference between the outputs F1(FA1, FB1, FC1' and FD1' in the examples of FIGS. 12 to 15) and F2 is obtained by a subtractor circuit 13(13A, 13B, 13C and 13D in the examples of FIGS. 12 to 15); the polarity of the difference output M(MA, MB, MC and MD in the examples of FIGS. 12 to 15) derived from the subtractor circuit 13 is discriminated by a polarity discriminator circuit 14; and the gate circuit 8 is controlled by the discriminated output N(NA, NB, NC and ND in the examples of FIGS. 12 to 15). Further, the difference between the output F1 and an output F2 (FA2', FB2', FC2''' and FD2''' in the examples of FIGS. 12 to 15) derived from the amplifier 12 is obtained with a subtractor circuit 13'; the polarity of the difference output M' (MA', MB', MC' and MD' in the examples of FIGS. 12 to 15) derived from the circuit 13' is discriminated by a polarity discriminator circuit 14'; and the gate circuit 8' is controlled by the discriminated output N' (NA', NB', NC' and ND' in the examples of FIGS. 12 to 15) derived from the circuit 14'.

It is apparent that, in accordance with the examples of FIGS. 12 to 15, if the gains of the system associated with the received pulse waves F1 and F2 (the receiving circuits 6A1 and 6A2 in the example of FIG. 12, the receiving circuits 6B1 and 6B2 in the example of FIG. 13 and the systems between the input side of the switching circuit 23 and the output side of the switching circuit 241 and between the input side of the switching circuit 23 and the output side of the switching circuit 242 in the examples of FIGS. 14 and 15) are taken as $g_1$ and $g_2$, if the gain of the amplifier 12 is taken as $g_3$ and if the value of the difference output M (MA and MD in the cases of FIGS. 12 and 15) and that of the difference output M' (MA' and MD' in the cases of FIGS. 12 and 15) are taken as $S_M$ and $S_M'$ respectively, the following equations can be obtained:

$$SM = g_1 \sqrt{S_{r1}^2 + S_{01}^2 - 2 S_{01} \cos(\pi - \phi)}$$
$$- g_1 \sqrt{S_{r2}^2 + S_{02}^2 - 2 S_{r2} S_{02} \cos(\pi - \phi)} \quad (14)$$

$$SM' = g_1 \sqrt{S_{r1}^2 + S_{01}^2 - 2 S_{r1} S_{01} \cos(\pi - \phi)}$$
$$- g_2 \times g_3 \sqrt{S_{r2}^2 + S_{02}^2 - 2 S_{r2} S_{02} \cos(\pi - \phi)} \quad (15)$$

By the way, the value $g_2/g_1$ to provide $S_M' = 0$ in the equation (14) and the value $(g_2 \cdot g_3)/g_1$ to provide $S_m = 0$ in the equation (15) bear the following relation:

$$\frac{g_2}{g_1} = \frac{g_2 g_3}{g_1} = \sqrt{\frac{S_{01}^2 + S_{r1}^2 - 2 S_{01} S_{r1} \cos(\pi-\phi)}{S_{02}^2 + S_{r2}^2 - 2 S_{02} S_{r2} \cos(\pi-\phi)}} = \alpha_{0c}'$$

$$(16)$$

which is of the same form as the aforesaid equation (10). Rearranged by using $\alpha_c$ and $\alpha_o$, the equation (16) becomes as follows:

$$\frac{g_2}{g_1} = \frac{g_2 g_3}{g_1} = \sqrt{\frac{\alpha_c^2 + \alpha_o^2 X^2 - 2\alpha_c \alpha_o X \cos(\pi - \phi_o)}{1 + X^2 - 2X\cos(\pi - \phi_o)}} = \alpha_{\omega}'$$

(17)

which is of the same form as the aforementioned equation (11). Accordingly, where that value of $g_2/g_1$ which is smaller than $\alpha_c$ is selected at the aforesaid $\alpha_s$ and the gains $g_2$ and $g_1$ are fixed in a manner to obtain a relation that $g_2/g_1 \approx \alpha_s$, if the value $S_m$ of the difference output M is below $\alpha_s$, the polarity of the difference output M is negative and if it is above $\alpha_c$, the polarity is positive. Further, where that value of $g_2 g_3/g_1$ which is larger than $\alpha_c$ is selected at $\alpha_s{}'$ and the gain $g_3$ is fixed in the above relation of $g_2$ and $g_1$ in a manner to obtain a relation that $g_2 g_3/g_1 = \alpha_s{}'$, if the value $S_M{}'$ of the difference output M' is smaller than $\alpha_s{}'$, the polarity of the difference output M' is negative and if it is larger than $\alpha_s{}'$, the polarity is positive.

Consequently, it is apparent that the same result as those described previously with regard to FIGS. 7 to 10 can be obtained by opening the gate circuit 8 with the discriminated output N when the polarity of the difference output M is detected negative by the polarity discriminator circuit 14 or by opening the gate circuit 8' with the discriminated output N' when the polarity of the difference output M' is detected positive by the polarity discriminator circuit 14'. This will become more apparent from FIG. 6 in which $g_2/g_1 = \alpha_s$ and $g_2 g_3/g_1 = \alpha_s{}'$ are included.

The description given with regard to FIGS. 12 to 15 has clarified the examples which are based on the relations of the aforesaid equations (3a) to (3d) in the case of using the subtractor circuit. It is also possible to employ these examples in any desired combination. FIG. 16 illustrates one example in which FIGS. 13 and 14 are combined with each other. Parts corresponding to those in FIG. 13 are identified by the same reference numerals and no detailed description will be repeated. One transmission and reception switching circuit 4 is provided in place of the two circuits 401 and 402 and one antenna 5BO is used in place of the two antennae 5B1 and 5B2. However, transmitter circuits 1B1 and 1B2 are each formed to include a pulse width modulator circuit and the one transmitter circuit 1B1 derives therefrom transmission pulse radar waves BB1' such that the carrier having a wavelength $\lambda_1$ is obtained in the "on" state period of a pulse having a pulse width $\tau_1$ based on the trigger pulse ABO and the other transmitter circuit 1B2 derives therefrom transmission pulse radar waves BB2' such that the carrier having a wavelength $\lambda_1$ is obtained in the "on" state period of a pulse having a pulse width $\tau_1$ based on the trigger pulse ABO. The transmission pulse radar waves BB1' and BB2' thus obtained are combined together and the composite waves are applied as transmission pulse radar waves BBO to the antenna 5BO through the transmission and reception switching circuit 4. The waves BBO are emitted as pulse radar waves CBO of a predetermined beam width from the antenna 5BO. Reflected waves DBO based on the emitted waves CBO are supplied to receiving circuits 6B1 and 6B2 through the antenna 5BO and the transmission and reception switching circuit 4. In this case, the receiving circuits 6B1 and 6B2 are adapted to obtain detected outputs based on the components of the wavelengths $\lambda_1$ and $\lambda_2$ respectively, so that received pulse waves FB1' and FB2' corresponding to those FB1 and FB2 in FIG. 13 and those FC1" and FC2" in FIG. 14 respectively are derived from the receiving circuits 6B1 and 6B2 respectively. In the same manner as described previously with regard to FIG. 13, the received pulse waves FB1' and FB2' thus obtained are supplied to the one input side of the adder circuit 7 and the received pulse radar waves BB2' are as received pulse waves BB2" fed to the other input side of the adder circuit 7 through the amplifier 12. The output GB' from the adder circuit 7 is derived as received pulse waves HB' and HB" through the gate circuits 8 and 8' respectively. Further, the received pulse waves FB1' and FB2', FB1' and FB2" are supplied to subtractor circuits 13 and 13' respectively and the outputs MB' and MB" from the subtractor circuits 13 and 13' are fed to polarity discriminator circuits 14 and 14' respectively, those outputs NB' and NB" are applied to the gate circuits 8 and 8' respectively.

With such an arrangement as shown in FIG. 16, it is possible to obtain the same results as those obtainable with the examples of FIGS. 13 and 14 and simplify the entire construction as compared with the latter, though not described in detail, since it will be apparent from the description given in connection with FIGS. 13 and 14.

Although the foregoing description has been given with regard to the case where the received pulse waves are processed in the form of detected outputs, it is possible to process them in an intermediate-freqency mode before detection. Further, in the foregoing, where the radar cross section is dependent upon the mode of polarization of the emitted pulse, the mode is horizontal or vertical polarization but it may be 40° polarization or vertical polarization or circular or horizontal or vertical polarization, so that the pulse can also be emitted in such mode. Moreover, the gate circuits 8 and 8' may be replaced with attenuators. In FIGS. 12 to 16, instead of inserting the amplifier 12 in the line for obtaining the received pulse waves F2 (FA2, FB2, FC2", FD2" and FB2' in the examples of FIGS. 12 to 16), as attenuator may be inserted in the line for obtaining the received pulse waves F1 (FA1, FB1, FC1", FD1" and FB1' in the examples of FIGS. 12 to 16), in which case, if the gain of the attenuator is taken as $g_4$, the aforesaid gains $g_1$ and $g_2 \times g_3$ can be read as $g_1/g_4$ and $g_2$ respectively.

The foregoing description has been given in connection with the case where $\alpha_c > \alpha_o$ but, where $\alpha_c < \alpha_o$, in the foregoing examples employing the divider circuit, its two input terminals are exchanged to reverse the relation between the signal to be divided and that to divide it and, also in the examples employing the subtractor circuit, its two input terminals are exchanged to reverse the relation between the signal to be subtracted and that to subtract.

It will be apparent that many modifications and variations may be effected without departing from the scope of the novel concepts of this invention.

We claim as our invention:

1. A marine radar transmission and reception system comprising:
   a. means for sequentially generating first and second transmission pulse radar waves of first and second pulse widths, respectively;
   b. an antenna for sequentially emitting the first and second transmission pulse radar waves in the same direction as first and second emitted pulse radar waves respectively and sequentially receiving first and second reflected pulse radar waves of the first and second emitted pulse radar waves;
   c. a receiving circuit supplied with the output of the antenna;
   d. means for producing first and second received pulse waves corresponding to the first and second reflected pulse radar waves from the output of the receiving circuit, respectively;
   e. a gate circuit for gating the output of the receiving circuit or either one of the first and second received pulse waves; and
   f. control means having a quotient circuit for producing the quotient output of the first and second received pulse waves, a setting circuit for deriving a predetermined threshold value output and a detector for detecting whether or not the quotient is in excess of the threshold value output;
   g. in which the gate circuit is controlled with the output of the detector of the control means, whereby sea clutter eliminated received pulse radar waves are obtained from the gate circuit.

2. A marine radar transmission and reception system comprising:
   a. means for generating transmission pulse radar waves;
   b. first and second antennae for sequentially emitting the transmission pulse radar waves in the same direction as first and second emitted pulse radar waves of first and second beam widths respectively and sequentially receiving first and second reflected pulse radar waves of the first and second emitted pulse radar waves respectively;
   c. a receiving circuit supplied with the outputs of the first and second antennae;
   d. means for producing first and second received pulse waves corresponding to the first and second reflected pulse radar waves from the output of the receiving circuit, respectively;
   e. a gate circuit for gating the output of the receiving circuit or either one of the first and second received pulse waves; and
   f. control means having a quotient circuit for producing the quotient output of the first and second received pulse waves, a setting circuit for deriving a predetermined threshold value output and a detector for detecting whether or not the quotient is in excess of the threshold value output;
   g. in which the gate circuit is controlled with the output of the detector of the control means, whereby sea clutter eliminated received pulse radar waves are obtained from the gate circuit.

3. A marine radar transmission and reception system comprising:
   a. means for sequentially generating first and second transmission pulse radar waves of first and second pulse widths, respectively;
   b. an antenna for sequentially emitting the first and second transmission pulse radar waves in the same direction as first and second emitted pulse radar waves respectively and sequentially receiving first and second reflected pulse radar waves of the first and second emitted pulse radar waves;
   c. a receiving circuit supplied with the output of the antenna;
   d. means for producing first and second received pulse waves corresponding to the first and second reflected pulse radar waves from the output of the receiving circuit, respectively;
   e. a parallel circuit of first and second gate circuits gating the output of the receiving circuit or either one of the first and second received pulse waves; and
   f. control means having a quotient circuit for producing the quotient of the first and second received pulse waves, first and second setting circuits for deriving first and second predetermined threshold value outputs respectively, and first and second detectors for detecting whether or not the quotient is in excess of the first and second threshold value outputs respectively;
   g. in which the first and second gate circuits are controlled with outputs of the first and second detectors of the control means, respectively, whereby sea clutter eliminated received pulse waves are obtained from the parallel circuit.

4. A marine radar transmission and reception system comprising:
   a. means for generating transmission pulse radar waves;
   b. first and second antennae for sequentially emitting the transmission pulse radar waves in the same direction as first and second emitted pulse radar waves of first and second beam widths respectively and sequentially receiving first and second reflected pulse radar waves of the first and second emitted pulse radar waves respectively;
   c. a receiving circuit supplied with the outputs of the first and second antennae;
   d. means for producing first and second received pulse corresponding to the first and second reflected pulse radar waves from the output of the receiving circuit, respectively;
   e. a parallel circuit of first and second gate circuits gating the output of the receiving circuit or either one of the first and second received pulse waves; and
   f. control means having a quotient circuit for producing the quotient of the first and second received pulse waves, first and second setting circuits for deriving first and second predetermined threshold value outputs respectively, and first and second detectors for detecting whether or not the quotient is in excess of the first and second threshold value outputs respectively;
   g. in which the first and second gate circuits are controlled with outputs of the first and second detectors of the control means, respectively, whereby sea clutter eliminated received pulse waves are obtained from the parallel circuit.

* * * * *